US007562876B2

(12) United States Patent
Sklansky et al.

(10) Patent No.: US 7,562,876 B2

(45) **Date of Patent: *Jul. 21, 2009**

(54) SYSTEM AND METHOD FOR PLAYING COMMUNITY HAND POKER GAMES UTILIZING MATHEMATICAL DEALER QUALIFYING CRITERIA

(75) Inventors: David Bruce Sklansky, Henderson, NV (US); Bradley Berman, Minnetonka, MN (US)

(73) Assignee: Sklansky Games, LLC, Minnetonka, MN (US)

( * ) Notice: Subject to any disclaimer, the term of this patent is extended or adjusted under 35 U.S.C. 154(b) by 183 days.

This patent is subject to a terminal disclaimer.

(21) Appl. No.: 11/069,928

(22) Filed: Mar. 1, 2005

(65) Prior Publication Data

US 2005/0167924 A1 Aug. 4, 2005

Related U.S. Application Data

(63) Continuation-in-part of application No. 10/686,020, filed on Oct. 15, 2003, now Pat. No. 7,044,468.

(51) Int. Cl.
*A63F 1/00* (2006.01)
*A63F 13/00* (2006.01)

(52) U.S. Cl. .......................... 273/292; 273/274; 463/13

(58) Field of Classification Search ................. 273/292, 273/274, 309; 463/12, 13
See application file for complete search history.

(56) References Cited

U.S. PATENT DOCUMENTS

| | | | |
|---|---|---|---|
| 4,861,041 | A | 8/1989 | Jones et al. |
| 4,948,134 | A | 8/1990 | Suttle et al. |
| 5,265,882 | A | 11/1993 | Malek |
| 5,328,189 | A | 7/1994 | Malek |
| 5,356,140 | A | 10/1994 | Dabrowski et al. |
| 5,377,993 | A | 1/1995 | Josephs |
| 5,382,025 | A | 1/1995 | Sklansky et al. |
| 5,486,005 | A | 1/1996 | Neal |
| 5,489,101 | A | 2/1996 | Moody |
| 5,496,038 | A | 3/1996 | Kangsanaraks |
| 5,531,448 | A | 7/1996 | Moody |
| 5,573,249 | A | 11/1996 | Johnson |

(Continued)

OTHER PUBLICATIONS

Casino Poker Guide, "Online Poker Rules", 2003.

(Continued)

*Primary Examiner*—Benjamin Layno
(74) *Attorney, Agent, or Firm*—Hollingsworth & Funk, LLC

(57) ABSTRACT

A system and method for facilitating play of a poker game utilizing mathematical dealer qualification criteria that impact the manner in which the game proceeds. The player(s) and dealer ante, and starting hands are dealt to the player(s) and dealer. The player may fold and lose the ante, or place a bet. The dealer's starting hand must meet mathematical qualifying criteria, such as a particular sum of point values assigned to each card. If the criteria is not met, the dealer does not qualify, and the player(s) win the dealer's ante amount. If the dealer's starting hand qualifies, the dealer calls the players' bets, and deals a community hand. Using their respective starting hands and the community hand, each of the players and dealer arrives at a resulting hand. If a player's resulting hand beats the dealer's based on poker rank, that player wins.

56 Claims, 15 Drawing Sheets

U.S. PATENT DOCUMENTS

| | | | |
|---|---|---|---|
| 5,577,731 A | 11/1996 | Jones | |
| 5,639,092 A | 6/1997 | Macaisa | |
| 5,645,281 A | 7/1997 | Hesse et al. | |
| 5,657,993 A | 8/1997 | Merlino et al. | |
| 5,718,430 A | 2/1998 | Aramapakul et al. | |
| 5,725,215 A | 3/1998 | Hesse | |
| 5,732,950 A | 3/1998 | Moody | |
| 5,795,225 A | 8/1998 | Jones et al. | |
| 5,799,945 A | 9/1998 | Boylan et al. | |
| 5,810,354 A | 9/1998 | Banyai | |
| 5,823,873 A | 10/1998 | Moody | |
| 5,839,732 A | 11/1998 | Guidi | |
| 5,845,906 A | 12/1998 | Wirth | |
| 5,845,907 A | 12/1998 | Wells | |
| 5,851,011 A | 12/1998 | Lott | |
| 5,868,392 A | 2/1999 | Kraft | |
| 5,901,958 A | 5/1999 | Andrews | |
| 5,911,419 A | 6/1999 | Delaney et al. | |
| 5,913,726 A | 6/1999 | Jones et al. | |
| 5,944,314 A | 8/1999 | Stavinsky | |
| 5,975,529 A | 11/1999 | deKeller | |
| 6,007,066 A | 12/1999 | Moody | |
| 6,068,552 A | 5/2000 | Walker et al. | |
| 6,098,985 A | 8/2000 | Moody | |
| 6,102,402 A | 8/2000 | Scott et al. | |
| 6,132,311 A | 10/2000 | Williams | |
| 6,206,373 B1 | 3/2001 | Garrod | |
| 6,206,374 B1 | 3/2001 | Jones | |
| 6,234,895 B1 | 5/2001 | Jones et al. | |
| 6,375,189 B1 | 4/2002 | Jones | |
| 6,402,150 B1 | 6/2002 | Jones | |
| 6,435,500 B2 | 8/2002 | Gumina | |
| 6,435,506 B1 | 8/2002 | Piccoli | |
| 6,467,771 B1 | 10/2002 | De Keller | |
| 6,474,645 B2 | 11/2002 | Tarantino | |
| 6,481,717 B1 | 11/2002 | Richardelle | |
| 6,503,145 B1 | 1/2003 | Webb | |
| 6,511,068 B1 | 1/2003 | Sklansky et al. | |
| 6,561,897 B1 | 5/2003 | Bourbour et al. | |
| 6,637,747 B1 | 10/2003 | Garrod | |
| 6,644,666 B1 | 11/2003 | Tamura et al. | |
| 6,712,693 B1 | 3/2004 | Hettinger | |
| 6,719,291 B1 | 4/2004 | De Keller | |
| 6,719,292 B2 | 4/2004 | Lo | |
| 6,719,631 B1 | 4/2004 | Tulley et al. | |
| 6,752,395 B2 * | 6/2004 | Jones et al. | 273/292 |
| 6,830,247 B2 | 12/2004 | Lo | |
| 6,959,928 B2 | 11/2005 | Schultz | |
| 7,044,468 B2 * | 5/2006 | Sklansky et al. | 273/292 |
| 7,121,550 B1 | 10/2006 | Lo | |
| 2001/0052671 A1 | 12/2001 | Stern | |
| 2001/0054796 A1 | 12/2001 | Lo | |
| 2002/0008356 A1 | 1/2002 | De Keller | |
| 2002/0043765 A1 | 4/2002 | Moody | |
| 2002/0083560 A1 | 7/2002 | Mennitto | |
| 2002/0142828 A1 | 10/2002 | Moody | |
| 2003/0027614 A1 | 2/2003 | Webb | |
| 2003/0162424 A1 | 8/2003 | Berman | |
| 2004/0041346 A1 | 3/2004 | Snow | |
| 2005/0082755 A1 | 4/2005 | Snow | |
| 2005/0104293 A1 | 5/2005 | Webb | |
| 2005/0107148 A1 | 5/2005 | Webb | |
| 2005/0269782 A1 | 12/2005 | Sklansky et al. | |
| 2006/0186600 A1 | 8/2006 | Sklansky et al. | |

OTHER PUBLICATIONS

U.S. Appl. No. 10/351,983, filed Jan. 27, 2003, Berman.

* cited by examiner

SINGLE BET/SINGLE QUALIFIER

| BET | QUALIFIER |
|---|---|
| $5 | 10 |

*FIG. 4A*

MULTIPLE BET/SINGLE QUALIFIER

| BET | QUALIFIER |
|---|---|
| $5 | 10 |
| $10 | |
| ⋮ | |
| $N | |

*FIG. 4B*

MULTIPLE BET/MULTIPLE QUALIFIER

| BET | QUALIFIER |
|---|---|
| $5 | 9 |
| $10 | Q |
| ⋮ | ⋮ |
| $N | QUALIFIER(N) |

*FIG. 4C*

| | 600 | 602 | 604 | 606 | 608 | 610 |
|---|---|---|---|---|---|---|
| | PLAYER STARTING HAND | PLAYER ACTION | DEALER STARTING HAND | DEALER ACTION | COMMUNITY CARDS | RESULT |
| 612 | 7 2 | FOLD | X | X | X | PLAYER LOSES $1 |
| 614 | 9 5 | BET 5 | 9 8 | FOLD | X | PLAYER WINS $1 |
| 616 | J 2 | BET 5 | 10 6 | CALL | J 8 5 3 2 | PLAYER WINS $6 |
| 618 | 5 5 | BET 5 | 8 8 | CALL | 8 8 5 5 2 | PLAYER LOSES $6 |
| 620 | J 2 | BET 5 | 10 6 | CALL | J 10 6 4 3 | PLAYER LOSES $6 |
| 622 | J 2 | BET 5 | 10 6 | CALL | J J J 6 3 | PLAYER WINS $30 |
| 624 | J 2 | BET 10 | 10 6 | FOLD | X | PLAYER WINS $1 |
| 626 | J 2 | BET 10 | Q 5 | CALL | J J Q 3 2 | PLAYER WINS $11 |
| 628 | J 2 | BET 10 | K 3 | CALL | J J J 4 3 | PLAYER WINS $55 |
| 630 | 7 7 | BET 10 | Q 8 | CALL | Q 9 6 4 2 | PLAYER LOSES $11 |
| 632 | 9 9 | BET 10 | J J | CALL | J J 9 9 2 | PLAYER LOSES $11 |

*FIG. 6*

SINGLE BET/SINGLE QUALIFIER

| BET | QUALIFIER SUM |
|---|---|
| $5 | 15 |

*FIG. 15A*

MULTIPLE BET/SINGLE QUALIFIER

| BET | QUALIFIER SUM |
|---|---|
| $5 | 15 |
| $10 | |
| ⋮ | |
| $N | |

*FIG. 15B*

MULTIPLE BET/MULTIPLE QUALIFIER

| BET | QUALIFIER SUM |
|---|---|
| $5 | 13 |
| $10 | 17 |
| ⋮ | ⋮ |
| $N | QUALIFIER(N) |

*FIG. 15C*

SYSTEM AND METHOD FOR PLAYING COMMUNITY HAND POKER GAMES UTILIZING MATHEMATICAL DEALER QUALIFYING CRITERIA

This is a continuation-in-part of application Ser. No. 10/686,020, filed Oct. 15, 2003, now U.S. Pat. No. 7,044,468 the content of which is incorporated herein by reference in its entirety.

FIELD OF THE INVENTION

This invention relates in general to card games, and more particularly to an apparatus and method for facilitating play of a poker game utilizing community cards and dealer qualification criteria that impact the manner in which the game proceeds.

BACKGROUND OF THE INVENTION

Card games such as poker have long been enjoyed by people as a means for entertainment. The popularity of casino gambling with wagering continues to increase, both in live table versions as well as electronic/computer-based casino gaming machines. Whether played in a gaming environment, or in a non-wagering environment such as a computer game, society's fascination with card games and gaming activity is unfaltering.

In one traditional cardroom poker game, players gather to compete against each other, by waging bets that their poker hand will have a higher poker rank than the other players' hands. The highest poker rank in each played hand is the winner of the hand, and if bets were made, the winner collects the bets made by the losing players for that hand.

Other table games are similar in that players place their bets, and the player with the winning hand wins the pot. One such poker game is known as "Hold'em," where each player at the table is dealt, face-down, a hand of two cards. After a betting round, the dealer turns face-up three communal cards known as the "flop." Bets are made, and additional communal cards are turned face-up, ultimately exposing the entire communal card hand known as the "board." Thus, each of the players uses his/her two-card face-up hand in connection with the board to determine the resulting poker rank, and the highest poker rank identifies the winner of the hand. The winner collects the pot.

Hold'em is among the most popular, if not the most popular, live poker game played today. It would therefore be desirable to provide a manner of simulating such games in a casino environment involving a dealer, and also to provide a new game involving additional excitement and anticipation, and more intricate and interesting betting strategies. The present invention provides such a poker game, and offers other advantages over existing poker games.

SUMMARY OF THE INVENTION

To overcome limitations in the prior art described above, and to overcome other limitations that will become apparent upon reading and understanding the present specification, the present invention discloses an apparatus and method for participating in a card game utilizing starting hands and community hands, and implementing qualifying criteria for dealer hands where the qualifying criteria at least in part dictates the manner in which the game proceeds.

In accordance with one embodiment of the invention, a method is provided for playing a card game. Such a method may be played in a live table version or in electronic embodiments. The method includes dealing a starting hand to a player(s) and to the dealer, where each starting hand represents a potential portion of a resulting poker hand. A bet is placed by the player. It is determined whether the dealer's starting hand meets certain qualifying criteria. If so, the dealer places a bet (e.g., calls the bet, physically presents a bet, etc.) responsive to the player's bet, and the dealer deals a community hand. A player poker rank for the player's resulting poker hand is determined, where the player's resulting poker hand is derived from cards including the player's starting hand and the community hand. Similarly, a dealer poker rank for the dealer's resulting poker hand is determined, where the dealer's resulting poker hand is derived from cards including the dealer's starting hand and the community hand. A winning poker is hand is identified among the player's resulting poker hand and the dealer's resulting poker hand. Such a method may analogously be applied to any number of players participating in the game.

In more particular embodiments of such a method, the player and dealer starting hands are provided as two-card starting hands, and the community hand is provided as a five-card community hand. This, however, is not a requirement, as the number of cards associated with the starting hands and/or community hand may be adjusted as desired. Further, determining the player poker rank for the player's resulting poker hand may involve determining a player poker rank for a five-card player resulting poker hand derived from the player's two-card starting hand and the five-card community hand, and determining the dealer poker rank for the dealer's resulting poker hand may involve determining a dealer poker rank for a five-card dealer resulting poker hand derived from the dealer's two-card starting hand and the five-card community hand. The winning poker hand may be identified by determining the highest poker rank of the player poker rank and the dealer poker rank. In other particular embodiments of such a method, initial bets or "ante" bets are placed by the player(s) and by the dealer prior to dealing the starting hands. In such case, the dealer/player with the winning poker hand collects the bets and antes. The player may have the opportunity to forgo placing the bet and consequently the opportunity to obtain a player's resulting poker hand, i.e. the player folds, in which case the player's ante is forfeited. The dealer does not place a post-ante bet and does not have the opportunity to stay in the game to obtain a dealer's resulting poker hand if the dealer's starting hand does not meet the qualifying criteria, in which case the dealer forfeits the dealer's ante.

In still other particular embodiments of such a method, the player may place a fixed bet of a predetermined amount. In other embodiments, placing a bet by the player involves wagering, by the player, one of a number of wager amounts available to the player. For example, in one embodiment, the player can select one of a number of fixed bets each associated with a particular predetermined amount. In such cases, some embodiments of the invention involve establishing different qualifying criteria dependent on the wager amount selected by the player. For example, the qualifying criteria may include a qualifying poker rank, where establishing different qualifying criteria involves increasing the qualifying poker rank relative to an increase in the player's wager amounts. Such a "relative" increase does not necessarily mean the increase in qualifying poker rank has to be precisely proportional to the increase in the player's wager amount (although it may be), but rather indicates that generally the qualifying poker rank will increase as the player's wager amount increases. An example would be that the qualifying poker rank may increase as the player's wager amount increases from $5 to $15, but the qualifying poker rank may increase at, for example, five dollar increments rather than precisely mathematically proportional (although such an embodiment may be feasible and/or practical in an electronic embodiment).

In still other embodiments of such a method, the player may be awarded with bonus amounts, based on the poker rank of the player's resulting hand. For example, one or more predetermined poker ranks may be identified as bonus levels, where each of these predetermined poker ranks is associated with a particular bonus payout. When the player's resulting hand reaches one of the bonus levels, the player may be awarded a bonus amount corresponding to that bonus level. Bonuses may be awarded for other subsets of the player's resulting hand, such as based on the cards in the player's starting hand. In still other embodiments, bonuses may be awarded using other subsets of the player's ultimate hand, such as the player's starting hand plus one or more of the cards of the community hand(s). One such example is a player's two-card starting hand plus the "flop," which may be the first X number of cards (e.g., three cards) of the community hand.

In accordance with another embodiment of the invention, a method is provided for electronically providing a card game. A player starting hand and a dealer starting hand are displayed to the player, where each starting hand includes one or more cards representing a potential portion of a resulting poker hand. A bet is placed by the player, such as via a user interface. It is determined whether the "virtual" dealer's starting hand meets certain qualifying criteria, and if so, the virtual dealer calls the player's bet and presents a community hand. A player poker rank for the player's resulting poker hand is determined, where the player's resulting poker hand is derived from cards including the player's starting hand and the community hand. Similarly, a dealer poker rank for the virtual dealer's resulting poker hand is determined, where the dealer resulting poker hand is derived from cards including the virtual dealer's starting hand and the community hand. A winning poker hand is identified among the player's resulting poker hand and the virtual dealer's resulting poker hand.

In another embodiment of the invention, a method is provided for playing a game, where initial bets such as antes are placed by the player(s) and the dealer. The method involves, dealing a two-card starting hand to the player(s) and dealer, where each two-card starting hand represents a potential portion of a resulting poker hand. The method further involves placing a second bet by the player; if the player opts to remain in the card game based on the player's two-card starting hand. It is determined whether the dealer's two-card starting hand meets predetermined qualifying criteria, and if so, placing a second bet by the dealer in response to the player's second bet, and dealing a multi-card community hand. A player poker rank for the player's resulting poker hand is determined, which is derived from the player's two-card starting hand and the multi-card community hand. Similarly, a dealer poker rank for the dealer's resulting poker hand is determined, which is derived from the dealer's two-card starting hand and the multi-card community hand. A winning poker hand is identified between the player's resulting poker hand and the dealer's resulting poker hand, where the winning poker hand is based on the highest poker rank between the player poker rank and the dealer poker rank.

In accordance with another embodiment of the invention, a computer-implemented poker apparatus is provided for allowing player participation in a card game. The poker apparatus includes a display device to display player and dealer starting hands, each of which include one or more cards representing a potential portion of corresponding player and dealer resulting poker hands. The apparatus includes a user interface to accept an ante bet by the player, and to accept a second bet placed by the player if the player chooses to continue in the card game. A processing system is configured to determine whether the dealer starting hand meets qualifying criteria, and if so, to call the player's second bet and cause the display device to display a community hand. The processing system is further configured to determine a player poker rank for the player's resulting poker hand derived from the player starting hand and the community hand, and to determine a dealer poker rank for the virtual dealer's resulting poker hand derived from the dealer starting hand and the community hand. Further, the processing system is configured to identify a winning poker hand between the player's resulting poker hand and the virtual dealer's resulting poker hand. The processing system can then settle bets. Such a poker apparatus may be provided via a casino gaming machine housing the display device, user interface, and processing system, or other computing-based system including a desktop computer, workstation, etc.

In accordance with another embodiment of the invention, a method is provided for playing a card game, where multiple community hands are concurrently played. The method involves dealing a starting hand to at least one player and to the dealer, where each starting hand includes one or more cards representing a potential portion of a resulting poker hand. A bet is placed by the player for each concurrent hand desired for participation. It is determined whether the dealer's starting hand meets qualifying criteria, and if so, a responsive bet is placed by the dealer and multiple community hands are dealt. Different community hands are dealt for each of the concurrent games to which the player is participating. The player poker ranks for each resulting poker hand are determined, using each of the multiple community hands in connection with the player's starting hand. Similarly, dealer poker ranks are determined for each resulting poker hand, using each of the multiple community hands in connection with the dealer's starting hand. A plurality of winning poker hands are identified based on the player resulting poker hands and corresponding dealer resulting poker hands.

In accordance with another embodiment of the invention, a method is provided for playing a card game, where the method includes dealing a starting hand to at least one player and to the dealer, where each starting hand includes one or more cards representing a potential portion of a resulting poker hand. The player places a bet, and it is determined whether the dealer's starting hand meets a mathematical qualifying criteria based on a plurality of the cards in the dealer's starting hand. This mathematical qualifying criteria may include a sum, difference, product, etc. of all or a subset of the dealer's starting hand. The dealer places a bet in response to the player's bet (e.g., calls the bet), and deals a community hand if the dealer's starting hand meets the mathematical qualifying criteria. A player poker rank is determined for the player's resulting poker hand that is derived from cards from the player's starting hand and/or the community hand. Similarly, a dealer poker rank is determined for the dealer's resulting poker hand that is derived from cards from the dealer's starting hand and/or the community hand. A winning poker hand is identified between the player's resulting poker hand and the dealer's resulting poker hand.

According to more particular embodiments of such a method, determining whether the dealer's starting hand meets a mathematical qualifying criteria involves determining whether a sum of point values of the plurality of the cards in the dealer's starting hand is greater than or equal to a predetermined value. In one embodiment, each card of a suit is associated with a different point value, where in another embodiment some of the cards may be associated with a common point value (e.g., face cards having the same point value) for use in determining whether the mathematical qualifying criteria has been met. In an alternative embodiment, determining whether the dealer's starting hand meets a mathematical qualifying criteria involves determining whether the sum of point values of the plurality of the cards in the dealer's starting hand is less than or equal to a predetermined value. Another embodiment for determining whether the dealer's starting hand meets a mathematical qualifying criteria involves determining whether a product of point values of the plurality of the cards in the dealer's starting hand is greater than or equal to a predetermined value, or alternatively whether the product is less than or equal to a predetermined value. Yet another embodiment for determining whether the dealer's starting hand meets a mathematical qualifying criteria involves determining whether a difference of point values of the plurality of the cards in the dealer's starting hand is greater than or equal to a predetermined value, or alternatively whether the difference is less than or equal to a predetermined value. In still another embodiment, determining whether the dealer's starting hand meets a mathematical qualifying criteria involves determining whether a quotient of point values of the plurality of the cards in the dealer's starting hand is greater than or equal to a predetermined value, or alternatively whether the quotient is less than or equal to a predetermined value. Any mathematical functions may be employed, and a single mathematical function may be employed as well as a combination of mathematical functions.

According to other particular embodiments of such a method, determining whether the dealer's starting hand meets a mathematical qualifying criteria may further involve determining whether the dealer's starting hand meets secondary qualifying criteria. For example, such secondary qualifying criteria may include cards of equivalent card ranks (e.g., pair, three-of-a kind, etc.), equivalent card suits (e.g., all spades), etc.

In other embodiments, the player may place a fixed bet of any desired amount, or may place a fixed bet of a predetermined amount. In other embodiments, the player may select one of a plurality of available fixed bets of corresponding predetermined amounts. Some embodiments of the invention involve determining whether the dealer's starting hand meets the mathematical qualifying criteria by determining whether the dealer's starting hand meets one of a plurality of predetermined mathematical qualifying criteria alternatives corresponding to the fixed bet selected by the player; e.g., the mathematical qualifying criteria may change for the dealer depending on the bet amount wagered by the player. For example, a first qualifying sum may be set as the qualifying criteria when a first bet amount is wagered, a second qualifying sum may be set as the qualifying criteria when a second bet amount is wagered, and so on.

According to still further embodiments of such a method, an ante or other initial bet(s) may be placed by the player and dealer. Such bets may be placed prior to dealing the starting hands, although this is not mandatory. One embodiment allows the player to fold and lose the ante/initial bet at a time after receiving at least one of the starting cards, all of the starting cards, or other number of cards less than all of the available starting cards. In one embodiment, the player may fold after seeing his/her complete starting hand, in which case the ante/initial bet is forfeited. Analogously, one embodiment involves the dealer losing the ante/initial bet amount (or other predetermined amount) in response to the dealer starting hand failing to meet the mathematical qualifying criteria.

In still other embodiments, the player may be awarded with a bonus (cash, credits, coupons, or other asset) if the player poker rank for the player's resulting poker hand is greater than or equal to a predetermined poker rank. Such an embodiment may further involve establishing one or more predetermined poker ranks and corresponding bonus payout amounts, and awarding the player with the bonus payout amount corresponding to the predetermined poker rank achieved by the player poker rank. Such bonuses may also be awarded for other groups of player's cards, such as the player's starting hand. For example, a pay table may be established to provide bonus awards for particular card combinations of a player's starting hand.

Different embodiments of such a method may involve live participation, such as at a table game version, or by way of an electronic version such as via a slot machine or other computerized kiosk. For example, an electronic version may involve displaying a player starting hand and a dealer starting hand to the player, where each starting hand includes one or more cards representing a potential portion of a resulting poker hand. The player places a bet, such as via a user interface. It is determined whether the dealer starting hand meets a mathematical qualifying criteria based on a plurality of the cards in the dealer's starting hand. The machine or "virtual dealer" places a bet in response to the player's bet. It should be recognized that in the electronic version or other versions such as a live table game, the dealer does not have to physically place the bet in response to the player's bet, but rather it is known that the dealer (including electronic virtual dealer) will call the bet and will pay the player if the player wins the hand(s). A multi-card community hand is then presented, if the dealer starting hand meets the mathematical qualifying criteria. Alternatively, the community hand may be presented even if the dealer does not meet the qualifying criteria, but in any event the hand has been won by the player if the qualifying criteria is not met. Player and dealer poker ranks are determined as described in the above method, and the player wins if the player's resulting poker hand has a higher (or in some cases equal) poker rank relative to the dealer's resulting poker hand.

Multiple community card versions are also contemplated by the present invention. In one embodiment, a method for playing a card game is provided. The method includes dealing a starting hand to at least one player and to the dealer, where each starting hand includes one or more cards representing a potential portion of a resulting poker hand. A bet is placed by the player for each concurrent hand desired for participation. It is determined whether the dealer's starting hand meets mathematical qualifying criteria based on at least some of the cards in the dealer's starting hand. If the dealer's starting hand meets the mathematical qualifying criteria, a bet is placed by the dealer in response to each of the player's bets (where "placing" a bet is intended to include simply "calling" the bet or otherwise agreeing to pay an amount), and a separate community hand is dealt for each of the concurrent hands in which the player is participating. The method further includes determining player poker ranks for each player resulting poker hand derived from cards including the player's starting hand and each of the community hands, determining dealer poker ranks for the dealer resulting poker hand derived from cards including the dealer's starting hand and each of the community hands, and identifying a plurality of winning poker hands based on the player resulting poker hands and corresponding dealer resulting poker hands.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described various examples in accordance with the invention.

BRIEF DESCRIPTION OF THE DRAWINGS

The invention is described in connection with the embodiments illustrated in the following diagrams.

FIGS. 4A, 4B, and 4C illustrate representative embodiments of dealer qualifying criteria that is based on the amount wagered by the player;

FIG. 6 is a table illustrating a number of exemplary game plays and corresponding results in accordance with the present invention;

FIGS. 15A, 15B and 15C illustrate representative embodiments of mathematical qualifying criteria that is based on the amount wagered by the player.

DETAILED DESCRIPTION OF THE INVENTION

Figure 1:
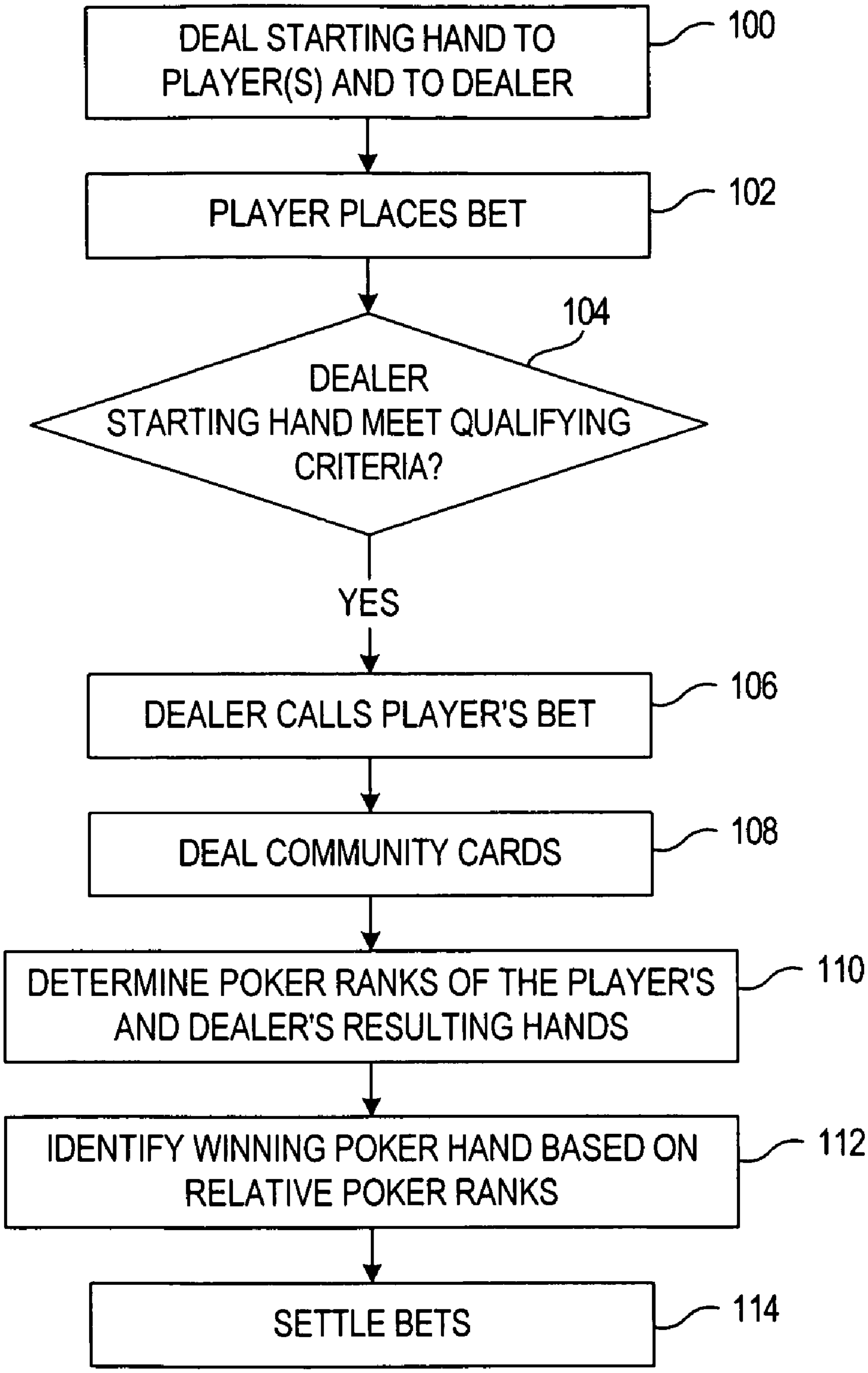
FIG. 1 is a flow diagram illustrating one embodiment of a method in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a card game and a manner of providing such a card game. The invention provides a manner for facilitating play of a card game utilizing community cards and dealer qualification criteria that impact the manner in which the game proceeds. More particularly, the invention is implemented in a poker game that includes a starting hand and at least one community hand. One such card game including a starting hand and communal hand is "Hold'em," where each player at the table is dealt, face-down, a hand of two cards. After a betting round, the dealer deals the first three cards, known as the "flop," of the community hand. Bets are made, and cards of the community hand are dealt, until the entire community hand is dealt. The exposed cards of the community hand are typically referred to as the "board." Thus, each of the players uses his/her two-card face-up hand in connection with the board to determine the resulting poker rank, and the highest poker rank identifies the winner of the round.

In accordance with the invention, a starting hand is dealt to the player(s) and to the dealer. The player may fold based on the state of the player's starting hand, or may place a bet. The dealer's starting hand must meet some defined qualifying criteria, such as a particular poker rank. If it does not, the dealer does not qualify, and hand is over. Where an ante or other initial bet is placed by the players and dealer, as is the case in an exemplary embodiment of the invention, and the dealer's starting hand does not qualify, the player wins the dealer's ante/initial bet assuming the player has not already folded. If, on the other hand, the dealer's starting hand does meet the qualification criteria, the dealer calls the players' bets, and deals a community hand. The community hand may be dealt all at once, or may include interim betting in accordance with the invention. Using their respective starting hands and the board, each of the players and the dealer arrives at a resulting hand. If a player's resulting hand beats the dealer's resulting hand based on poker rank, that player wins. For example, the player may receive a net win amount equal to the dealer's call bets made in response to the player's ante and post-ante bets. In other words, in such an embodiment the player wins the total amount wagered between that player and the dealer. As is described more fully below, various embodiments of the present invention provide additional features and benefits such as, for example, allowing players to decide on a wager amount, where the player-selected wager amount is a factor in determining what the dealer's qualifying criteria will be for that hand.

The present invention also provides a similar card game and manner of providing such a game, where the dealer qualification criteria includes a mathematical qualifying criteria. In these embodiments of the invention, the starting hands are dealt to the dealer and player(s), and it is determined whether the dealer's starting hand meets this mathematical qualifying criteria based on all or a subset of the cards in the dealer's starting hand. By way of example and not of limitation, the mathematical qualifying criteria may be sufficiently high "sum" of point values for all of the cards in the dealer's starting hand. The bets are placed/called, and a community hand is dealt by the dealer if the dealer's starting hand meets the mathematical qualifying criteria such that the hand will continue. The actual time in which the community hand is dealt relative to placement of bets may vary in accordance with the invention. Poker ranks of resulting hands are determined for the dealer's hand and each player's hand, where the starting hands and community hand(s) are used to derive the resulting hands. A winning poker hand is identified between the dealer and the player(s) using the resulting poker ranks.

As will become more evident in the ensuing description, the present invention may be played in a live table version, or in an electronic environment (e.g., computer-implemented video game/machine, casino kiosk, etc.). Electronic embodiments of the invention generally involve a single game participant with no other players associated with the game, however other players may be participating in the game via remote gaming machines. Further, electronic embodiments may involve a computerized dealer or "virtual dealer." However, the description herein relating to how the game may be played is applicable to both live table games and electronic embodiments.

It should be recognized that, for purposes of the present description, the community hand may be referred to as the community hand, community cards, communal cards/hand, the board, etc. It should also be recognized that reference may be made to a dealer calling a bet, matching a bet, placing a bet, etc. In some embodiments, a dealer may physically match a player's bet using money, a chip(s), selecting an appropriate bet designator, or the like. However, in other embodiments such as a casino environment, reference to a dealer placing, matching, or calling a bet does not involve a physical bet being presented by the dealer. In such embodiments, the dealer "in essence" places a matching ante or other bet when the dealer calls such bets, but typically does not physically present the house/dealer bet amount until, and unless, the player wins the hand as it pertains to that player and the dealer. In other words, a live table embodiment of the invention will generally not involve (although it may) any physical presentation of bets by the dealer, but rather the dealer simply calls the players' bets. In an electronic embodiment, a visual representation of the dealer's "bets" may, or may not, be displayed on the screen. In any event, as used in connection with the present invention, reference to a dealer placing, matching, calling, or otherwise making an ante and/or other bet is intended to include both situations where the dealer does not physically present the ante/bet (e.g., tantamount to the dealer/house promise to pay) and situations where the dealer does in fact physically present the ante/bet.

FIG. 1 is a flow diagram illustrating one embodiment of the present invention. In the illustrated embodiment, starting hands are dealt 100 to each of the players and to the dealer. The game may be played with a dealer and one player, or with multiple players. In one embodiment, the player's resulting hands are not played against one another, but rather each of the player's resulting hands is played against the dealer's resulting hand. It is further noted that in an exemplary embodiment of the invention, an ante or other initial bet is made by each of the players and by the dealer.

In one embodiment such as a live table version of the game, the starting hands are dealt face down. Having been dealt a starting hand, each of the players may place 102 a bet. In some embodiments, the player may fold upon seeing his/her respective starting hand, in which case the player would lose any ante or other initial bet placed. Assuming the player does not fold, the players place 102 their bets.

At this point, it is determined 104 whether the dealer's starting hand meets some qualifying criteria. In one embodiment, this qualifying criteria is represented by a predetermined poker rank, such as a 10-high or better, or other predetermined poker rank. Any particular poker rank may be selected, and may be based on the desired return percentage to the house. In one embodiment, if the dealer does not qualify, the hand is over, and the dealer forfeits the ante amount to each of the remaining players in the game. In any event, if the dealer's starting hand meets the qualifying criteria, the dealer calls 106 the player's bet(s) or otherwise places a bet in response to the player's bet. In one embodiment, the dealer calls each of the players' bets, such that the dealer bets against each of the players with the same wager amount as was made by that player. For example, if the bet amount for the game is fixed at $5 and each of the players bets $5, then the dealer will call the $5 bet or otherwise match the $5 bet against each of the participating players.

In accordance with the invention, the dealer will not call any post-ante bets, or deal 108 the community cards, unless the dealer's starting hand met the qualifying criteria. Where such criteria is met, the dealer will call 106 the bets and deal 108 the community cards. Using their respective starting hand in connection with the board, each player as well as the dealer derives the best poker hand possible (i.e., having the highest poker rank), as shown at block 110. The winning poker hand is identified 112, based on the relative poker ranks of each of the players' resulting hands with respect to the dealer's resulting hand, and the bets are settled 114. For example, if a first player has a resulting hand having a higher poker rank than the dealer's resulting hand, that first player is a winner, and will receive the bet amount called by the dealer (i.e., the ante amount plus the player's bet amount). If a second player has a resulting hand having a lower poker rank than the dealer's resulting hand, that second player does not win, and forfeits his/her wagered amount to the dealer/house.

Figure 2:
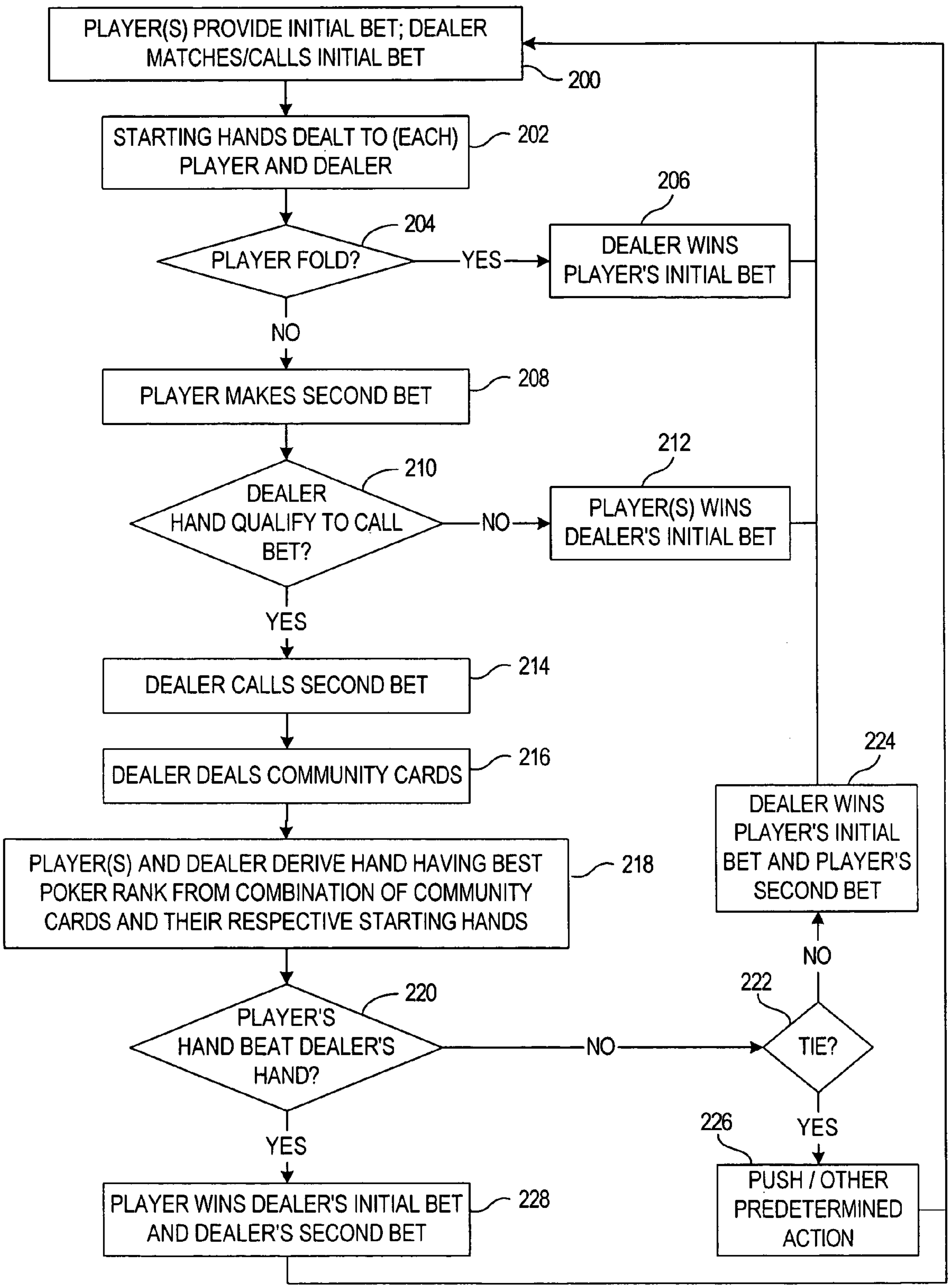
FIG. 2 illustrates another embodiment of a manner of participating in a dealer-qualification card game in accordance with the present invention.

FIG. 2 illustrates another embodiment of a manner of participating in a dealer-qualification card game in accordance with the present invention. In the embodiment of FIG. 2, the player(s) provides an initial bet or "ante," and the dealer calls or otherwise matches the ante as shown at block 200. Starting hands are dealt 202 to the player(s) and to the dealer. The player may fold, and if the player folds as determined at decision block 204, the dealer/house wins 206 the player's ante. If the player does not fold, the player makes a second bet (relative to the ante), as shown at block 208.

The dealer then determines 210 whether the dealer's starting hand has met the qualification criteria, such as having at least one card being a 10-high or better, or a pair. The qualifying criteria may be dependent on the number of cards associated with the starting hand. For example, for a two-card starting hand, a 10-high or better, or a pair may be selected as the qualifying criteria. In an embodiment where more than two cards are dealt for the starting hand, some other predetermined qualifying hand may be identified. For example, if the starting hand is a three-card hand, A-high or a pair may be the qualifying criteria.

If the dealer's starting hand does not meet the qualifying criteria, the player wins 212 the dealer's ante, and the hand is over. If the dealer's starting hand qualifies 210, the dealer calls 214 the player's bet or otherwise makes a second bet in response to the player's bet, and deals 216 all or a portion of the community hand. For example, in one embodiment, all cards of the community hand may be dealt, such as all five cards in a five-card community hand. Alternatively, interim bets may be allowed. For example, for a five-card community hand, three cards of the community hand may be dealt or otherwise exposed, and another bet may be allowed by the players. Another card(s) of the community hand may then be dealt or otherwise exposed, and more interim bets allowed, and so forth until the entire community hand has been dealt/exposed. In such an embodiment, the dealer may look at the dealer's starting hand without exposing it to the players, until all bets have been placed at which time the dealer's starting hand may be exposed. In still other embodiments, the community hand may be dealt in a non-consecutive manner, without additional bets. For example, the first three cards of the community hand may be dealt to the board face up, then a card is burned or otherwise discarded, then another card dealt to the board, another card burned, and a final card of a five-card community hand dealt. Dealing in this fashion may present additional anticipation for the players. It should be noted, however, that the present invention is not limited to any particular manner of dealing or otherwise presenting the community cards, nor is the invention limited in the number of community cards that may be used for the community hand.

The player and dealer each derive 218 a hand having the best poker rank from a combination of the community hand and their respective starting hands. For example, where the starting hands are two-card starting hands and the community hand is a five-card community hand, the player and the dealer will derive the best five-card poker hand based on the seven cards comprising the communal hand and their respective two-card starting hands. If the player's hand does not beat the dealer's hand as determined at decision block 220, the dealer/house has either won the hand or a tie has occurred. If it is not a tie as determined at decision block 222, the dealer/house wins 224 the player's ante and second bet(s). If there is a tie, house rules or other predetermined rules will dictate the action, as shown at block 226. For example, a tie may result in a "push" such that no money is exchanged. In other embodiments, a tie may result in the player losing to the house—i.e., the house rules may require the player's hand to outright beat the dealer's hand in order to win. In yet another embodiment, the predetermined action/rules may allow the player to win when a tie occurs. Again, the present invention is not limited to any particular rules for ties, as any desired rules may be provided for ties in accordance with the present invention. If the player's hand does beat the dealer's hand as determined at decision block 220, the player wins 228 the dealer's matching ante and second bet(s).

Figure 3:
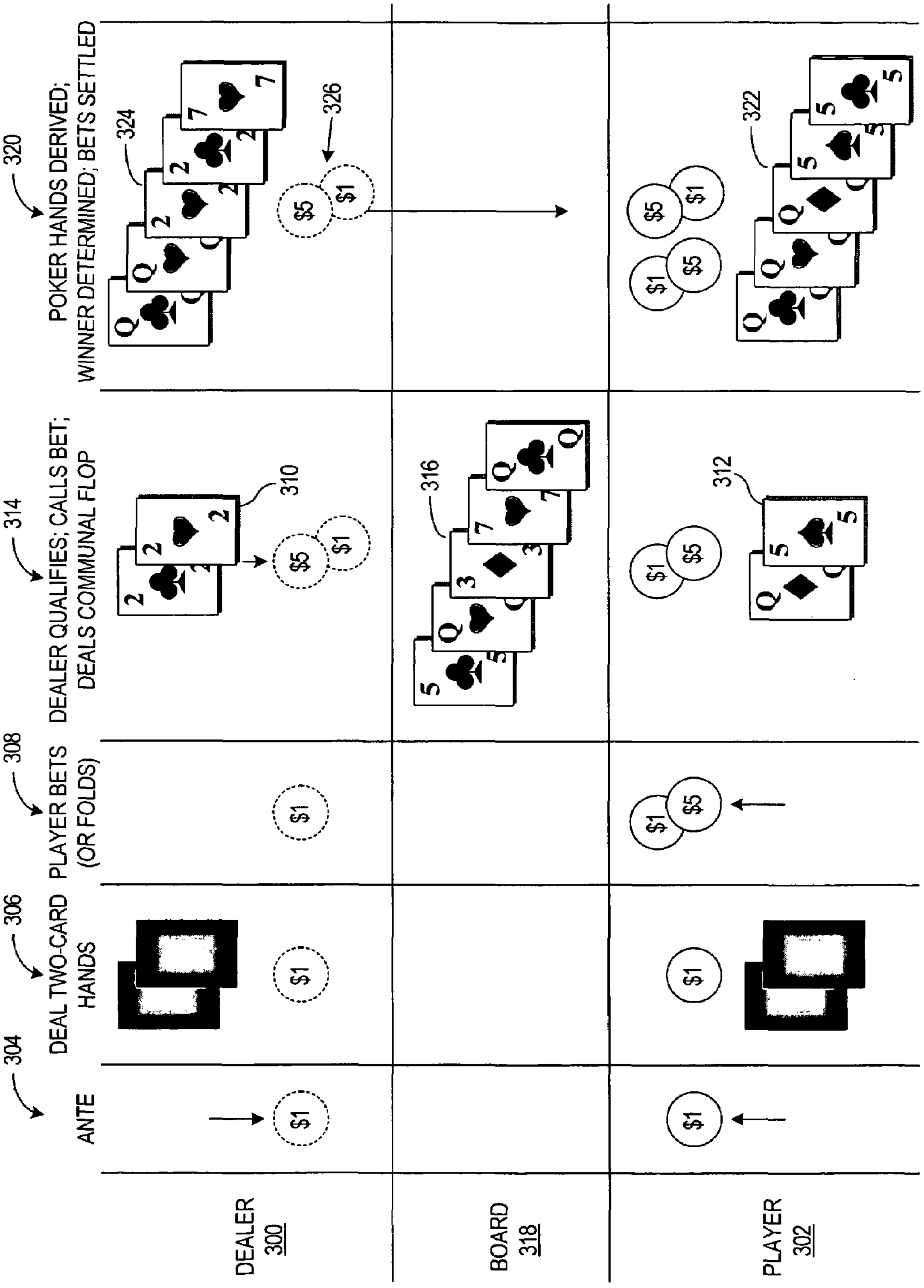
FIG. 3 is a diagram illustrating a representative hand in a dealer-qualification card game in accordance with the present invention.

FIG. 3 is a diagram illustrating a representative hand in a dealer-qualification card game in accordance with the present invention. In the illustrated example, the dealer 300 and player 302 each submit an ante 304. Again, it should be recognized that the dealer does not have to "physically" present an ante, but rather may simply call the player's ante such that the dealer/house is expected to pay the ante in the event that the dealer loses to the player. Because the dealer's ante and other bets do not require physical presentation of chips, money, or other actual bets, the ante and bet amounts for the dealer 300 shown in FIG. 3 are shown by dashed lines.

In the illustrated example, the ante is shown as $1, although the ante 304 may be any desired amount. A two-card hand 306 is dealt to both the dealer 300 and the player 302. In one embodiment, the two-card hand 306 is dealt face down to the dealer and to the player. In another embodiment, the two-card hand 306 may be dealt face up for the player 302. For example, in an electronic embodiment, the player's two-card hand 306 would generally be "dealt" (i.e., electronically displayed) face up.

The player 302 may fold at this point, or otherwise place a bet 308. In the example of FIG. 3, the player 302 places a $5 bet 308 in addition to the previously-submitted ante. The dealer 300 then exposes the two-card hand 310 (or otherwise perceives the value of the hand in an electronic version). If the dealer's 300 starting hand 310 does not qualify by meeting the qualifying criteria, the player 302 receives a net win of the dealer's 300 ante 304. Otherwise, as shown at stage 314, the dealer 300 qualifies, calls the player's bet ($5 in the illustrated embodiment), and deals the community hand 316 to create the board 318. As shown at stage 320, the dealer's 300 and player's 302 poker hands are derived using their respective two-card starting hands 310, 312 and the communal hand 316, the winner is determined, and the bets are settled. In this example, the player's 302 best hand is a full house (Q,Q,Q, 5,5) 322, and the dealer's 300 best hand is two pair (Q,Q,2,2) 324. Therefore, the player 302 wins the bets called by the dealer, and arrives at a net win amount corresponding to the dealer's 300 total bet 326.

In accordance with one embodiment of the invention, the player is allowed to choose the amount of the bet to be made if the player does not decide to fold. For example, the player may be allowed to choose one of a plurality of predefined wager amounts, such as choosing either $5 or $10 to bet. Any number of different predefined wager amounts may be made available to the player. In another embodiment, the player can wager any amount within a predetermined wager range, such as any amount between $5 and $15. In this manner, the player can win (or lose) a lesser or greater amount where the dealer calls the players bet with an equivalent or otherwise proportional amount.

In one embodiment of the invention, the dealer's qualifying criteria is dependent on the amount wagered by the particular player. FIGS. 4A, 4B, and 4C illustrate representative embodiments of dealer qualifying criteria that is based on the amount wagered by the player. FIG. 4A illustrates a single bet/single qualifier embodiment. In this embodiment, only one bet amount is available to the player, which is $5. The qualifying criteria for such a bet is fixed at a 10-high. In other words, the dealer must have at least one card in the dealer's starting hand that is a ten or higher, or have a pair, in order to qualify. The particular qualifier amount may be set to any desired poker rank. Further, in one embodiment, the qualifier may change within a range, such as change between a 9-high and a J-high. Such a qualifier change within a range may be made randomly, which may be particularly interesting and easy to implement in an electronic version of the game.

FIG. 4B illustrates a multiple bet/single qualifier embodiment. In this embodiment, the qualifier remains the same (i.e., poker rank of 10-high or better) regardless of the bet placed by the player. FIG. 4C illustrates a multiple bet/multiple qualifier embodiment, where the qualifier changes depending on the bet (or range of bets) placed by the player. For example, a $5 bet placed by the player results in a 9-high or better poker rank qualifier, and a $10 bet results in a Q-high or better poker rank qualifier in the illustrated embodiment. In this embodiment, any bet amount ($N) results in a qualifier that is a function of the bet amount as depicted by QUALIFIER(N). It should be noted that the bet amounts of $5, $10, through $N may be fixed, such that only those particular bet amounts are available for the player to bet. In other words, the player may have the option of betting $5, $10, etc., but may not bet an amount between those fixed amounts, or above or below the highest or lowest allowable bet respectively. In another embodiment, the bet amounts may be ranges, such that bets can be placed anywhere between $5 and $N, and the qualifier will change when the player bet reaches the next level. For example, a bet of $5, $6, $7, $8, or $9 (assuming bets on a whole dollar levels only) will result in a qualifier of 9-high or a pair, and a bet of $10 through the next level will result in a qualifier of Q-high or a pair, and so forth. Again, these represent examples only, and the qualifying poker rank and correspondence with bet amounts may be selected in any desired manner.

Figure 5:
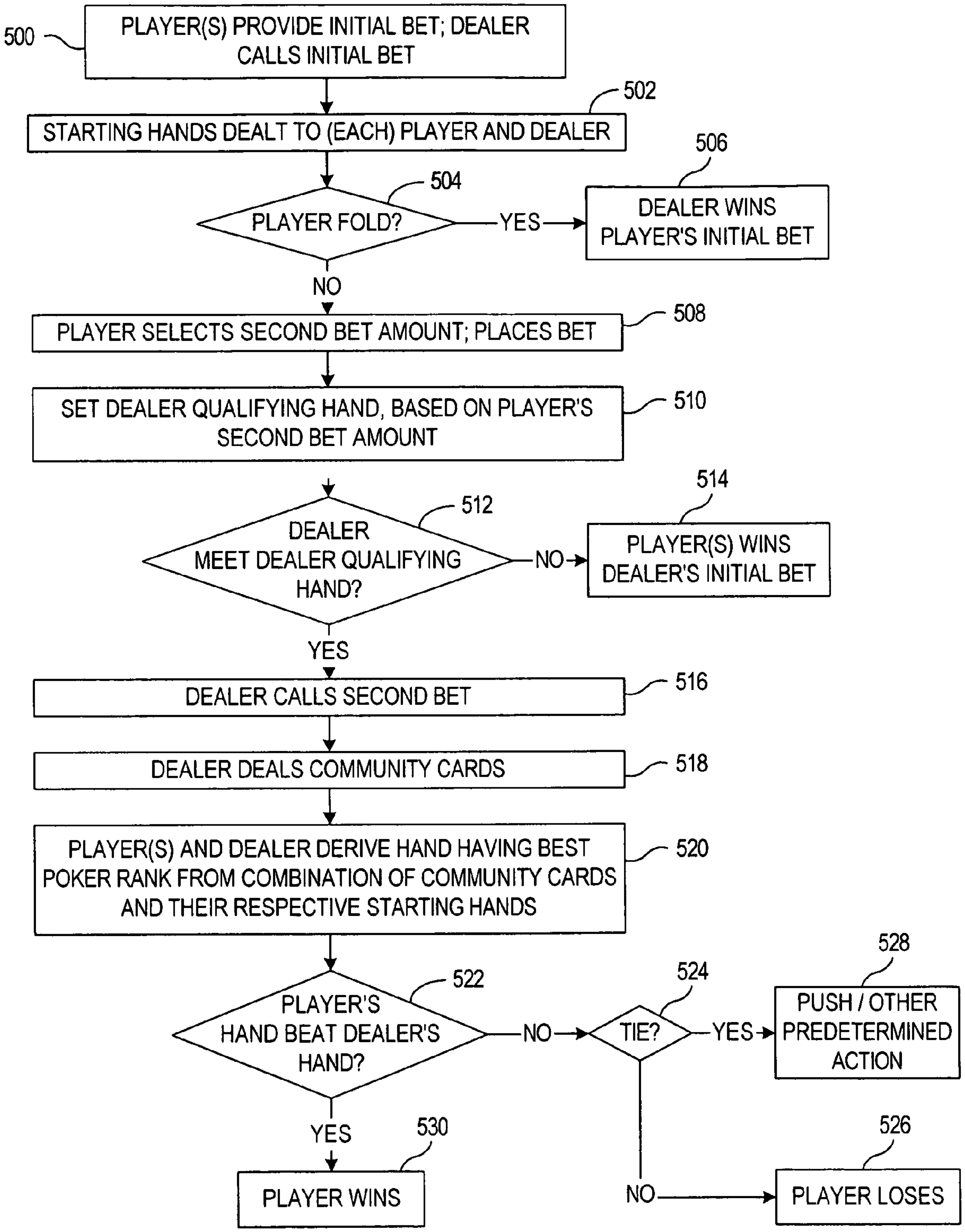
FIG. 5 illustrates another embodiment of a manner of participating in a dealer-qualification card game in accordance with the present invention, where the player may choose a bet amount, and the qualifier is dependent upon the player's selected bet amount.

FIG. 5 illustrates another embodiment of a manner of participating in a dealer-qualification card game in accordance with the present invention, where the player may choose a bet amount, and the qualifier is dependent upon the player's selected bet amount. In the embodiment of FIG. 5, the player (s) provides an ante/initial bet and the dealer calls the bet, as shown at block 500. Starting hands are dealt 502 to the player (s) and to the dealer. The player may fold, and if the player folds as determined at decision block 504, the dealer wins 506 the player's ante. If the player does not fold, the player selects a bet amount, and places the selected bet as shown at block 508. For example, the player may select a $10 bet among bet choices of $5 and $10.

The dealer's qualifying hand is then set 510, where setting the qualifying hand is based on the player's second bet amount. More particularly, where the player bet $5 rather than $10, the qualifying hand may be set 510 to a 10-high or better (e.g., at least one card being a 10, J, Q, K, A, or any pair). Alternatively, where the player bet $10 rather than $5, the qualifying hand may be set 510 to a Q-high or better. Based on the established qualifying hand, it is determined 512 whether the dealer's starting hand meets the qualifying hand. If not, the player wins 514 the dealer's ante, and the hand is over. If the dealer's starting hand qualifies 512, the dealer calls 516 the player's bet or otherwise makes a second bet in response to the player's bet, and deals 518 the community cards. The player and dealer each derive 520 a hand having the best poker rank from a combination of the community cards and their respective starting hands. For example, where the starting hands are two-card starting hands and the communal hand is a five-card hand, the player and the dealer will derive the best five-card poker hand based on the seven cards comprising the community hand and their respective two-card starting hands. If the player's hand does not beat the dealer's hand as determined at decision block 522, the dealer/house has either won the hand or a tie has occurred. If it is not a tie as determined at decision block 524, the player loses 526 the hand; i.e., the dealer/house wins the player's ante and second bet(s). If there is a tie, house rules or other predetermined rules will dictate the action, as shown at block 528. For example, a tie may result in a push, or alternatively the rules may award the win to one or the other of the dealer or player. Again, the present invention is not limited to any particular rules for ties, as any desired rules may be provided for ties in accordance with the present invention.

If the player's hand does beat the dealer's hand as determined at decision block 522, the player wins 530 the dealer's matching ante and second bet(s). It should be noted that in one embodiment of the invention, the winning amount providing to a player having a winning hand may be less than the total of the player's ante and bets. For example, if the player's ante was $1 and the player bet $5 and won the hand, the player may awarded $6 in return, or may be awarded some amount less than $6. In another embodiment, the player may be awarded more than the player's ante and bets. One such embodiment is described more fully below, where the player may be awarded a bonus depending on the poker rank associated with his/her resulting hand.

FIG. 6 is a table illustrating a number of exemplary game plays and corresponding results in accordance with the present invention. Each game play is described in terms of a player's two-card starting hand 600 and ensuing player action 602, the dealer's two-card starting hand 604 and ensuing dealer action 606, a five-card community hand 608, and the "net" result 610 to the player. For purposes of this example, it is assumed that the player(s) ante $1, and the player can choose between subsequent bets of $5 or $10. For purposes of this example it is also assumed that the qualifying criteria is dependent on the player's bet amount such that a bet of $5 requires the dealer to have a 10-high or better starting hand to qualify, and a bet of $10 requires the dealer to have a Q-high or better starting hand to qualify. For purposes of this example, it is also assumed that a conventional poker rank is used, such as set forth in Table 1 below:

TABLE 1

| Poker Rank | |
|---|---|
| Hand | Example |
| Royal Flush | A, K, Q, J, 10 (suited) |
| Straight Flush | 3, 4, 5, 6, 7 (suited) |
| Four Of A Kind | 8, 8, 8, 8, 5 |
| Full House | 10, 10, 10, J, J |
| Flush | 3, 6, 8, J, Q (suited) |
| Straight | 5, 6, 7, 8, 9 (unsuited) |
| Three Of A Kind | Q, Q, Q, 2, 3 |
| Two Pair | A, A, J, J, 10 |
| One Pair | Q, Q, 4, 5, 9 |
| High Card In Hand | A, Q, 4, 5, 8 |

It is also noted that for purposes of the example of FIG. 6, no suited hands, such as a any type of flush, are considered for ease of illustration.

In a first game play 612, the player has a starting hand 600 of (7,2). The player decides 602 to fold, and therefore the dealer starting hand 604, dealer action 606, and community hand 608 is irrelevant to this player for this game 612. The net result 610 to the player is that the player loses his/her ante of $1.

In game play 614, the player has a starting hand 600 of (9,5). The player does not fold, and instead decides 602 to bet $5. The dealer has a starting hand 604 of (9,8). Because the qualifier for a $5 player bet is 10-high or better, the dealer action 606 is to fold, in which case the result 610 is that the player wins the dealer's $1 ante bet.

In game play 616, the player has a starting hand 600 of (J,2). The player does not fold, and instead decides 602 to bet $5. The dealer has a starting hand 604 of (10,6), and therefore qualifies for a $5 player bet. The dealer action 606 is to call the bet, and deal the community cards 608 which are (J,8,5,3,2). In this case, the player obtains two pair (J,J,2,2), and the dealer obtains only a J-high hand. The result 610 is therefore that the player receives a net win of the dealer's ante and the dealer's $5 call bet, for a total of $6.

In game play 618, the player has a starting hand 600 of (5,5). The player does not fold, and instead decides 602 to bet $5. The dealer has a starting hand 604 of (8,8), which is a pair and has a poker rank higher than the required qualifying criteria of 10-high for a $5 player bet. The dealer action 606 is to call the bet, and deal the community cards 608 which are (8,8,5,5,2). In this case, the player obtains a 5-high four-of-a-kind (5,5,5,5), but the dealer obtains an 8-high four-of-a-kind (8,8,8,8). The result 610 is therefore that the player loses the ante and bet, for a total loss of $6. It should be noted that in one embodiment of the invention, the player is still eligible for bonus awards even if the player's hand does not beat the dealer's hand. Such bonus awards are described more fully below.

In game play 620, the player has a starting hand 600 of (J,2). The player does not fold, and instead decides 602 to bet $5. The dealer has a starting hand 604 of (10,6), and therefore qualifies for a $5 player bet. The dealer action 606 is to call the bet, and deal the community cards 608 which are (J,10,6,4,3). In this case, the player obtains a pair of Jacks (J,J), and the dealer obtains two pair (10,10,6,6). The result 610 is that the player loses a total of $6.

In one embodiment of the invention, a player can receive an additional bonus if the player obtains a hand that corresponds to a predetermined poker rank. Such bonus payouts may be made in any desired manner. Table 2A illustrates an example of such a bonus payout schedule relating to a player's resulting hand.

TABLE 2A

| Bonus Table | | |
|---|---|---|
| Hand | Example | Bonus |
| Royal Flush | A, K, Q, J, 10 (suited) | ×20 |
| Straight Flush | 3, 4, 5, 6, 7 (suited) | ×10 |
| Four Of A Kind | 8, 8, 8, 8, 5 | ×5 |

Thus, if a player obtains four-of-a-kind, a multiplier of 5 is applied to the player's winnings. According to the bonus table of Table 2A, a straight flush results in a multiplier of 10, and a royal flush results in a multiplier of 20. Alternatively, fixed monetary values may be provided by the bonus rather than multiplier values. Further, bonuses may be implemented for any type of hand with the desired multiplier/value associated therewith.

Bonuses may be awarded for additional and/or different subsets of the player's hand, such as based on the cards in the player's starting hand. For example, a pay table may be established to provide bonus awards for particular card combinations of a player's starting hand. One representative example is shown in Table 2B below:

TABLE 2B

| Bonus Table | |
|---|---|
| Starting Hand | Bonus |
| A, A (red Aces) | pays 50 to 1 |
| A, K (suited) | pays 25 to 1 |
| A, A (any Aces) | pays 20 to 1 |
| Pair of J, Q, K | pays 10 to 1 |
| Pair of 6, 7, 8, 9, 10 | pays 4 to 1 |
| Pair of 2, 3, 4, 5 | pays 2 to 1 |
| Suited | pays 1 to 1 |

The embodiment shown in Table 2B is provided for purposes of illustration only, and not of limitation. Any number of bonuses may be provided. For example, in other embodiments, bonuses may be awarded using other subsets of the player's cards, such as the player's starting hand plus one or more of the cards of the community hand(s). One such example involves a player's two-card starting hand plus the "flop," which may be the first X number of cards (e.g., three cards) of the community hand.

Returning now to FIG. 6, game play 622 involves a player starting hand 600 of (J,2). The player does not fold, and decides 602 to bet $5. The dealer has a starting hand 604 of (10,6), and therefore qualifies for a $5 player bet. The dealer action 606 is to call the bet, and deal the community cards 608 which are (J,J,J,6,3). In this case, the player obtains four-of-a-kind (J,J,J,J), and the dealer obtains a full house (J,J,J,6,6). The result 610 is that the player wins a total of $30. This is due to the player winning the $1 ante and $5 call bet from the dealer (totaling $6), and receiving a ×5 multiplier as shown in Table 2A above, resulting in a $30 win for the player. In another embodiment, had the dealer won the hand (e.g., four Kings), the player may still be eligible for a bonus award. In such an embodiment, a particular value rather than a multiplier may be used, or the entire bonus schedule may be based on particular values rather than multipliers.

In game play 624, the player has a starting hand 600 of (J,2). The player does not fold, and decides 602 to bet $10. The dealer has a starting hand 604 of (10,6). Because the qualifier for a $10 player bet is Q-high or better, the dealer action 606 is to fold, in which case the result 610 is that the player wins the dealer's $1 ante bet.

In game play 626, the player has a starting hand 600 of (J,2). The player does not fold, and decides 602 to bet $10. The dealer has a starting hand 604 of (Q,5), and therefore qualifies for a $10 player bet. The dealer action 606 is to call the bet, and deal the community cards 608 which are (J,J,Q,3,2). In this case, the player obtains a full house (J,J,J,2,2), and the dealer obtains two pair (Q,Q,J,J). The result 610 is therefore that the player receives a net win of the dealer's $1 ante plus the dealer's $10 call bet, for a total of $11.

In game play 628, the player has a starting hand 600 of (J,2). The player does not fold, and decides 602 to bet $10. The dealer has a starting hand 604 of (K,3), and therefore qualifies for a $10 player bet. The dealer action 606 is to call the bet, and deal the community cards 608 which are (J,J,J,4,3). In this case, the player obtains four-of-a-kind (J,J,J,J), and the dealer obtains a full house (J,J,J,3,3). The result 610 is that the player wins a total of $55. This is due to the player winning the $1 ante and $10 call bet from the dealer (totaling $11), and receiving a ×5 multiplier as shown in Table 2A above, resulting in a $55 win for the player.

In game play 630, the player has a starting hand 600 of (7,7). The player does not fold, and instead decides 602 to bet $10. The dealer has a starting hand 604 of (Q,8), and therefore qualifies for a $10 player bet. The dealer action 606 is to call the bet, and deal the community cards 608 which are (Q,9,6,4,2). In this case, the player obtains a pair of sevens (7,7), and the dealer obtains a pair of Queens (Q,Q). The result 610 is that the player loses a total of $11, which equals the player's $1 ante plus the player's $10 bet.

In game play 632, the player has a starting hand 600 of (9,9). The player does not fold, and decides 602 to bet $10. The dealer has a starting hand 604 of (J,J), which is a pair and has a poker rank higher than the required qualifying criteria of Q-high or better for a $10 player bet. The dealer action 606 is to call the bet, and deal the community cards 608 which are (J,J,9,9,2). In this case, the player obtains a 9-high four-of-a-kind (9,9,9,9), but the dealer obtains a Jack-high four-of-a-kind (J,J,J,J). The result 610 is that the player loses the ante and bet, for a total loss of $11. As previously indicated, other embodiments of the invention may still award the player a bonus based on his/her resulting hand, even if the player's hand did not beat the dealer's hand.

Figure 7A:
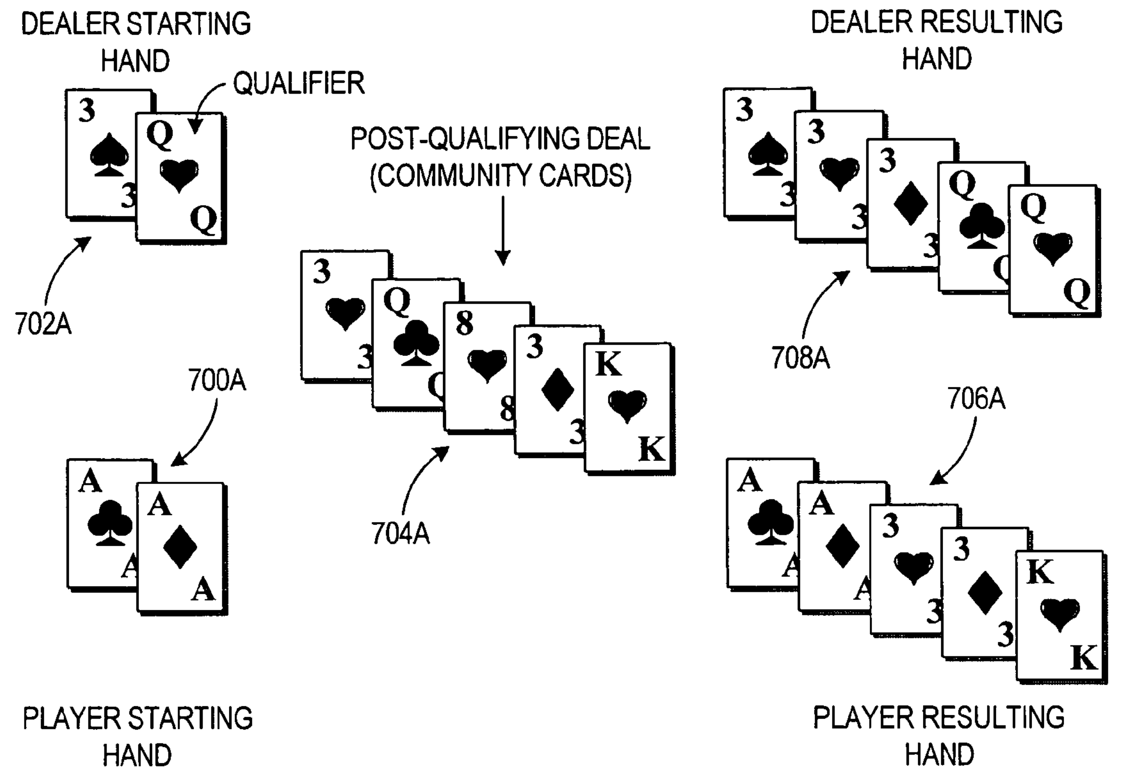
FIGS. 7A and 7B illustrate the ability for any participant to be in the running for the highest payouts, or to lose when initially having a strong starting hand, even though the bets are already in place and the dealer has qualified.
Figure 7B:
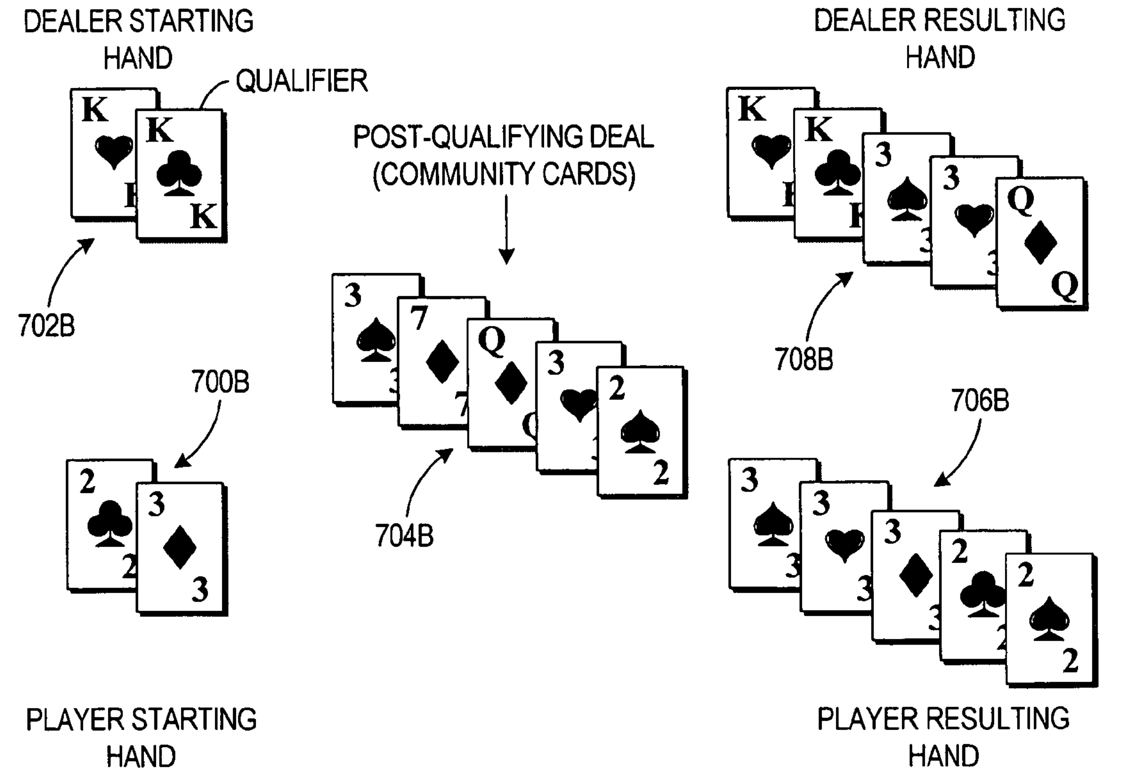

As can be seen from the foregoing examples, a player may receive a poor starting hand from a poker rank perspective, yet still be in the game and ultimately win the full amount. In other words, even though the player starts out with a poor hand, the fact that post-bet/post-qualifying communal cards are presented leaves the player in a position to still be able to beat the dealer outright, and win the dealer's ante and bet total. On the other hand, even if the player has a good starting hand from a poker rank perspective, the player could still lose to the dealer who may have a poor starting hand. FIGS. 7A and 7B illustrate this. In FIG. 7A, the player starting hand 700A is better from a poker rank perspective than the dealer starting hand 702A. The post-qualifying communal hand 704A is dealt, and the ultimate result is that the dealer obtains a full house (3,3,3,Q,Q) 708A and the player obtains two pair (A,A,3,3) 706A. Even though the player started with a better starting hand than the dealer, the player did not win the hand.

Conversely, as illustrated in FIG. 7B, the player starting hand 700B is worse from a poker rank perspective than the dealer starting hand 702B. The post-qualifying communal hand 704B is dealt, and the ultimate result is that the player obtains a full house (3,3,3,2,2) 706B and the dealer obtains two pair (K,K,3,3) 708B. Even though the player started with a worse starting hand than the dealer, the player won the hand.

Figure 8:
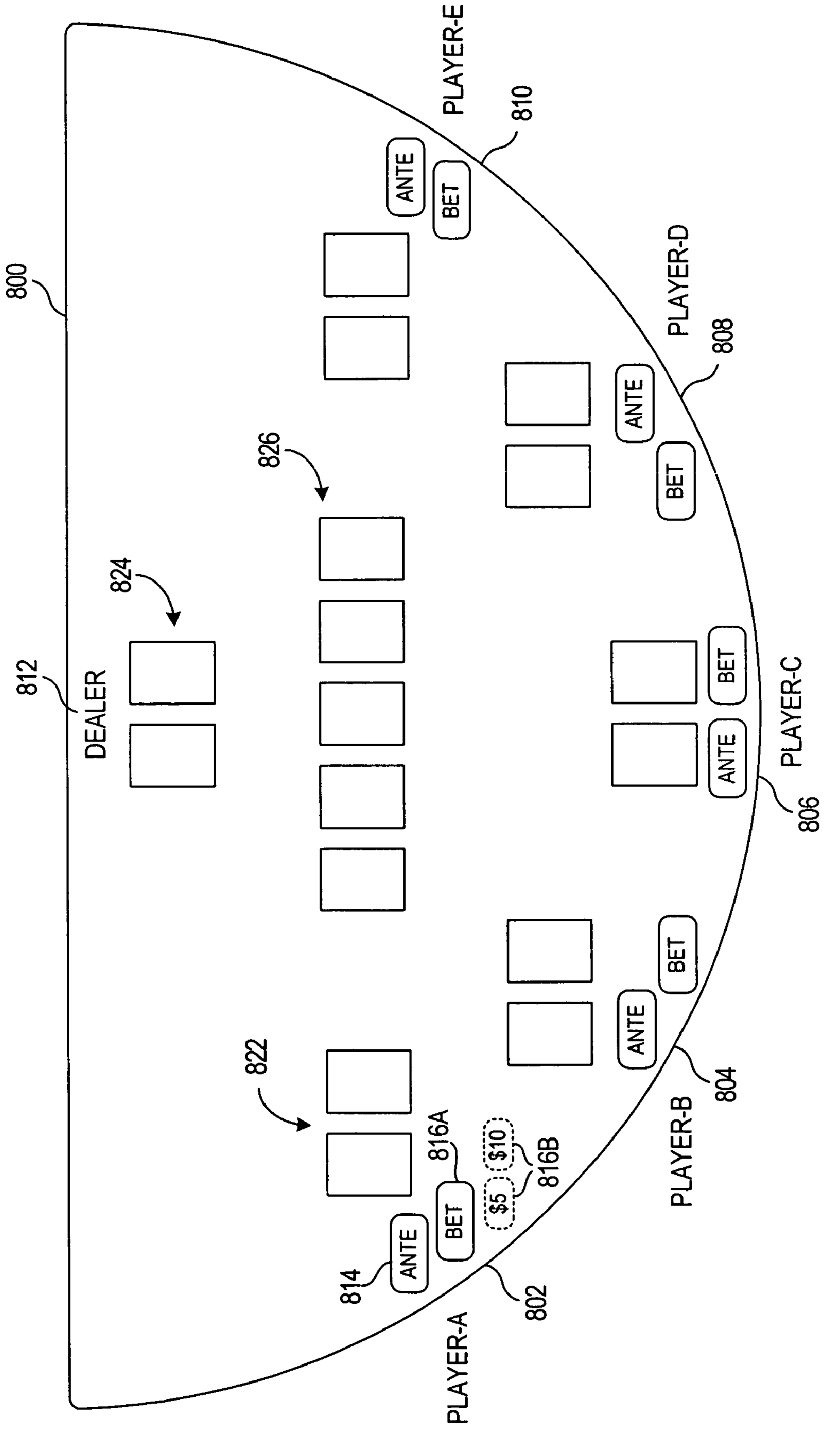
FIG. 8 illustrates an example of a table layout for use in playing live casino versions of the poker game in accordance with the invention.

A card game according to the present invention may be implemented in live table versions. An example table layout 800 is illustrated in FIG. 8 for use as a gaming table cover or top surface in playing live casino versions of the poker game in accordance with the invention. The embodiment of FIG. 8 includes a plurality of player locations 802, 804, 806, 808, 810 spaced around an arcuate peripheral edge at which one or more players will sit or stand during play of the game. The dealer may face the players from a dealer location 812, such as behind the straight edge of the layout 800. The layout 800 may be formed from a felt material in a manner known in the art, for example, in connection with conventional Twenty-One table layouts. Alternatively, the layout may be physically incorporated into the surface of a gaming table.

Each of the player locations, for example, player location 802, may include wagering indicia, such as an ante area 814 and bet area 816A. By placing a coin(s), bill(s), marker(s), chip(s) or other token(s) to be associated with the ante area 814, the player makes his/her ante. Similarly, by placing a coin(s), bill(s), marker(s), chip(s) or other token(s) to be associated with the bet area 816A, the player makes his/her bets. Such a bet area 816A may be used for embodiments allowing only a single fixed bet (e.g., $5), or in embodiments that involve multiple bets (e.g., $5 and $10; bets within a range, etc.). Alternatively, separate indicia 818B may be used to place bets of different values for embodiments allowing bets of different values. This may be beneficial, for example, to the dealer to more easily determine what the dealer's qualifying criteria will be for each player. It should be noted that no such indicia 814, 816A, 816B is required at all in other embodiments, as the value of the bets placed by the players may be self-explanatory.

The dealer deals the starting hands, such as player starting hand 822 and dealer starting hand 824. Each non-folding player makes a wager. The dealer determines whether the dealer starting hand 824 meets the qualifying criteria, and if so, calls the bets of each of the participating players, and deals the community hand 826. The players' cards are turned face-up, and the best poker hand from their respective starting hands (e.g., 822) and the community hand 826 is determined. The dealer pays out for players whose resulting poker hands beat the dealer's resulting poker hand, and the house takes the bets of the losing players. In the event of a tie, no money is exchanged (i.e., "push"), or other predetermined rules may be followed.

Figure 9:
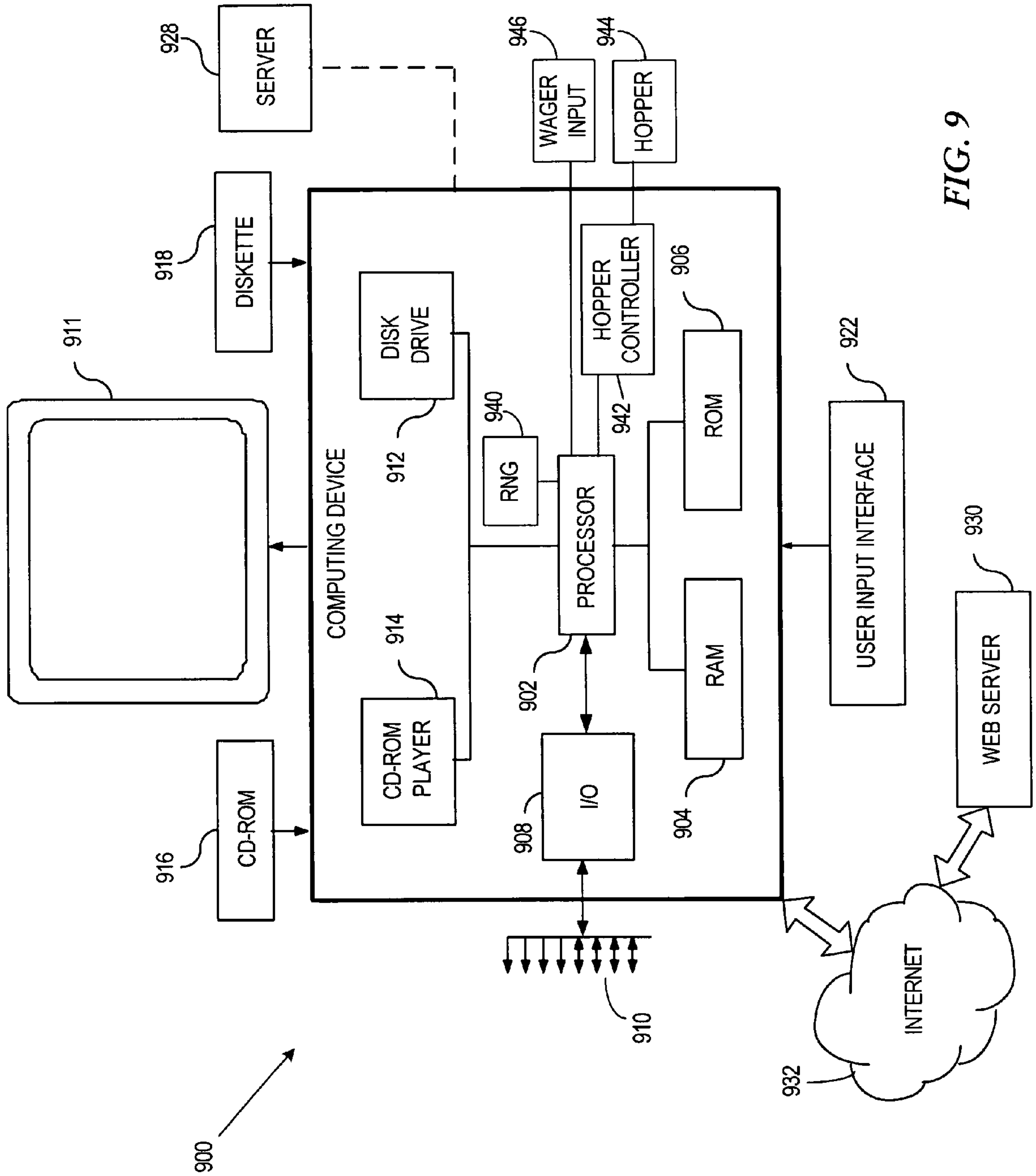
FIG. 9 illustrates a representative computing system capable of carrying out operations in accordance with the invention.

The present invention may also be implemented as a casino gaming machine such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 9.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 900 of FIG. 9 is an example computing structure that can be used in connection with such electronic gaming machines, computers, or other computer-implemented devices to carry out operations of the present invention.

The example computing arrangement 900 suitable for performing the gaming functions in accordance with the present invention typically includes a central processor (CPU) 902 coupled to random access memory (RAM) 904 and some variation of read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals, communication signals, and the like.

Chance-based gaming systems such as slot machines, in which the present invention is applicable, are governed by random numbers and processors. A monitor 911 or other display device is used to display the gaming activity as facilitated by a random number generator (RNG). RNGs are well-known in the art, and may be implemented using hardware, software operable in connection with the processor 902, or some combination of hardware and software. A processor 902 associated with the system, under appropriate program instruction, can simulate the dealing of cards. The present invention is operable using any known RNG, and may be integrally programmed as part of the processor 902 operation, or alternatively may be a separate RNG controller 940.

The computing arrangement 900 may also include one or more data storage devices, including hard and floppy disk drives 912, CD-ROM drives 914, and other hardware capable of reading and/or storing information such as DVD, etc. In one embodiment, software for carrying out the operations in accordance with the present invention may be stored and distributed on a CD-ROM 916, diskette 918 or other form of media capable of portably storing information. These storage media may be inserted into, and read by, devices such as the CD-ROM drive 914, the disk drive 912, etc. The software may also be transmitted to the computing arrangement 900 via data signals, such as being downloaded electronically via a network, such as the Internet. Further, as previously described, the software for carrying out the functions associated with the present invention may alternatively be stored in internal memory/storage of the computing device 900, such as in the ROM 906. The computing arrangement 900 is coupled to the display 911, which represents a display on which the gaming activities in accordance with the invention are presented. The display 911 merely represents the "presentation" of the video information in accordance with the invention, and may be any type of known display or presentation screen, such as LCD displays, plasma display, cathode ray tubes (CRT), etc. Where the computing device 900 represents a stand-alone or networked computer, the display 911 may represent a standard computer terminal or display capable of displaying multiple windows, frames, etc. Where the computing device is embedded within an electronic gaming machine (see FIG. 10), the display 911 corresponds to the display screen of the gaming machine/kiosk. A user input interface 922 such as a mouse, keyboard, microphone, touch pad, touch screen, voice-recognition system, etc. may be provided.

The computing arrangement 900 may be connected to other computing devices or gaming machines, such as via a network. The computing arrangement 900 may be connected to a network server 928 in an intranet or local network configuration. The computer may further be part of a larger network configuration as in a global area network (GAN) such as the Internet. In such a case, the computer accesses one or more web servers 930 via the Internet 932.

Other components directed to gaming machine implementations include manners of gaming participant payment, and gaming machine payout. For example, a gaming machine including the computing arrangement 900 may also include a hopper controller 942 to determine the amount of payout to be provided to the participant. The hopper controller may be integrally implemented with the processor 902, or alternatively as a separate hopper controller 942. A hopper 944 may also be provided in gaming machine embodiments, where the hopper serves as the mechanism holding the coins/tokens of the machine. The wager input module 946 represents any mechanism for accepting coins, tokens, coupons, bills, credit cards, smart cards, membership cards, etc. for which a participant inputs a wager amount.

As indicated above, the present invention may be implemented in stand-alone video poker versions. An electronic video poker device of the general type suitable for use in the practice of the game according to the present invention is generally illustrated in FIG. 10.

Figure 10:
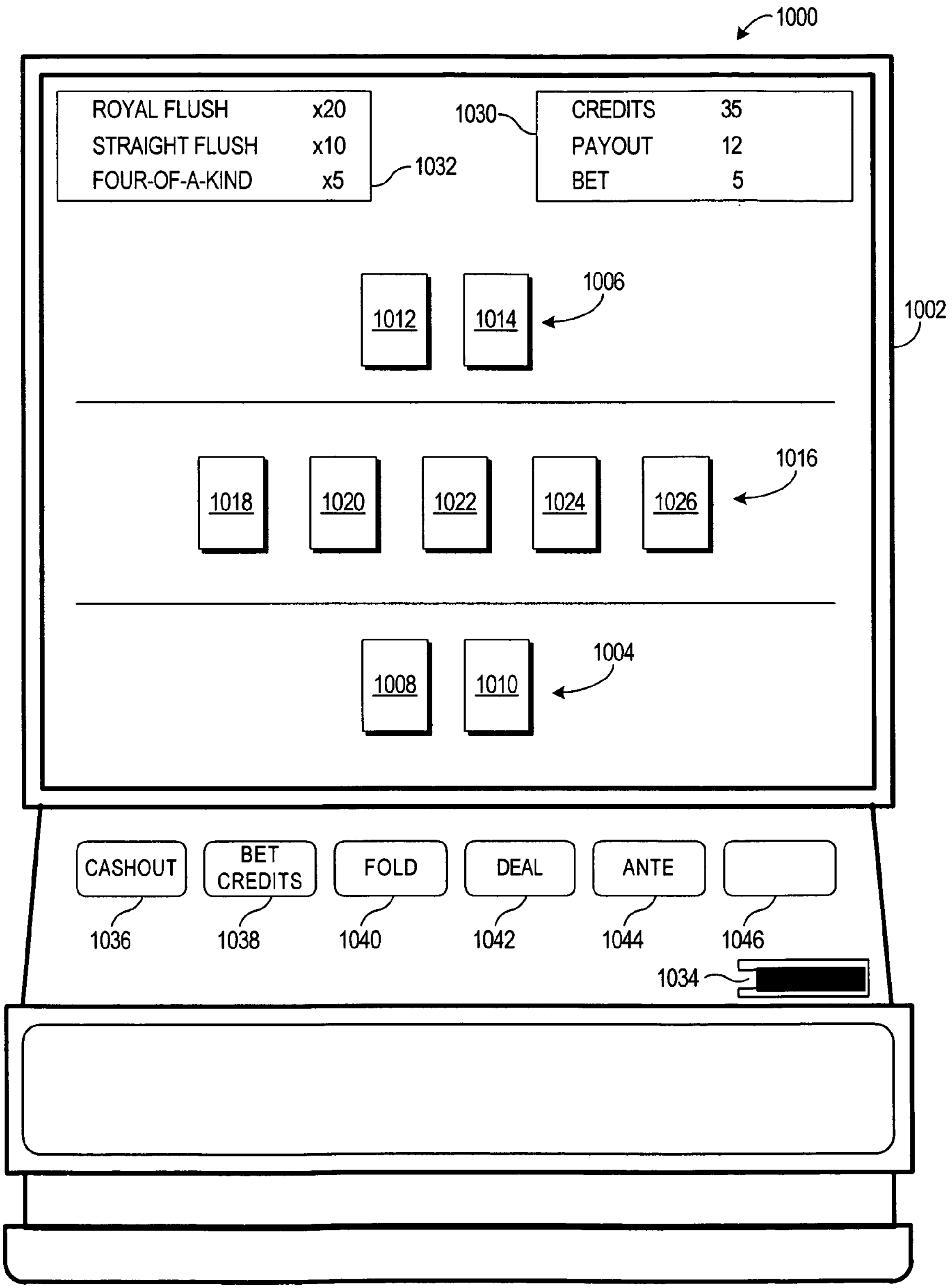
FIG. 10 illustrates a representative electronic video poker device of the general type suitable for use in the practice of the game according to the present invention.

As depicted in FIG. 10, the electronic video poker device 1000 includes a display screen 1002 operative in a well known manner to display representations of conventional playing cards thereon. In accordance with the present invention, a central processing unit (CPU; not shown) of the device 1000 is instructed pursuant to one or more computing programs which may, for example, be stored in a read-only memory (ROM), programmable read-only memory (PROM) or other storage medium of the internal circuitry. The stored program code may be selectively determined, within the ambit of a programmer of ordinary skill in the art, having the benefit of the instant disclosure, to enable the electronic device 1000 to play the card games of the present invention. A first portion of the display screen 1002 is operative to display, face-up, at least one starting hand 1004 for the player, and to display a starting hand 1006 for the dealer which is dealt face-down in one embodiment of the invention. The player starting hand 1004 includes screen card representations 1008, 1010, and the dealer starting hand 1006 includes screen card representations 1012, 1014. In accordance with generally known technology in the field of video poker machines, the CPU of the device 1000, under appropriate program instruction, may accurately simulate the random dealing of each of the starting hands from one or more conventional card decks. Another portion of the display screen 1002 is similarly operative to display the community hand 1016 associated with the game. In the example of FIG. 10, the community hand includes five community cards, including cards 1018, 1020, 1022, 1024, 1026.

A display segment or panel 1030 may be provided to display the value of the current bet, for example 5 tokens (where tokens may represent, for example, nickels, dimes, quarters, dollars, etc.), the number of accumulated credits, and the number of tokens paid out. A display segment or panel 1032 may be provided to display a bonus table, if one is available for the game.

A token acceptor 1034 is operative to receive wager tokens, or alternatively, coins, bills, credit/debit cards, coupons, smart cards, prepaid casino cards, and the like. Various control buttons 1036, 1038, 1040, 1042, 1044, 1046 allow the player to make control inputs during play of the game of the present invention. In an example manner of play of the electronic video poker device 1000, a player first enters tokens, coins, prepaid card, credit card, or the like into the acceptor 1034 to acquire a credit balance on credit display 1030. If desired, the player may alternatively place each bet individually after each hand by inserting coins, tokens, bills, etc.

The player can press the ANTE button 1044 to submit an initial bet/ante. By pressing the DEAL button 1042, the player's and dealer's starting hands 1004, 1006 may be dealt. Alternatively, the starting hand 1004 and 1006 may automatically be dealt upon the player placing the ante bet.

A FOLD button 1040 allows the player to fold if desired. If the player folds, the ante amount is forfeited. If the player does not fold, the player may activate the BET CREDITS button 1038 one or more times to place a wager which is displayed by bet display 1030. In one embodiment, repeated activation of the BET CREDITS button 1038 will increase the player's bet. In another embodiment, additional BET CREDITS buttons may be provided, where each of such buttons may be associated with a different bet amount. The electronic device 1000 may be programmed to limit the number of tokens that can be bet on a single hand. Such a limit is dependent on a predetermined limit of credits per hand (as well as the number of concurrent hands that will be played in an embodiment allowing multiple community hands to be concurrently played with the player's starting hand 1004).

The DEAL button 1042 may be used to initiate the rest of the play. For example, pressing the DEAL button 1042 may cause the dealer's starting hand 1006 to be compared against the appropriate qualifying criteria, to payout an amount if the dealer does not qualify, and to cause the dealer to call the bet and deal the community hand 1016 if the dealer's hand qualifies. Alternatively, such action may automatically occur in response to the player making a bet.

When (and if) the bets have been placed and the community hand 1016 has been dealt, the winning hand is identified. The CASH OUT button 1036 can be used to allow the player to cash out any accumulated credit balance.

As may now be readily understood, the device 1000 may be programmed to play various embodiments of the invention. Alternatively, the device may include a control input to allow a player to select play of different variations of the game. In connection with certain embodiments of the invention, the device 1000 may be programmed to make appropriate bonus payouts. For example, bonus payouts may be made in accordance with the odds set forth in Tables 2A and/or 2B above, but may be made in any predetermined manner.

In another embodiment of the invention, multiple community hands may be played concurrently by one or more of the players in the game. This may be implemented in both table games as well as electronic versions. For purposes of illustration, such a version is described in connection with an electronic game, although the principles are equally applicable to a live table game.

Figure 11:
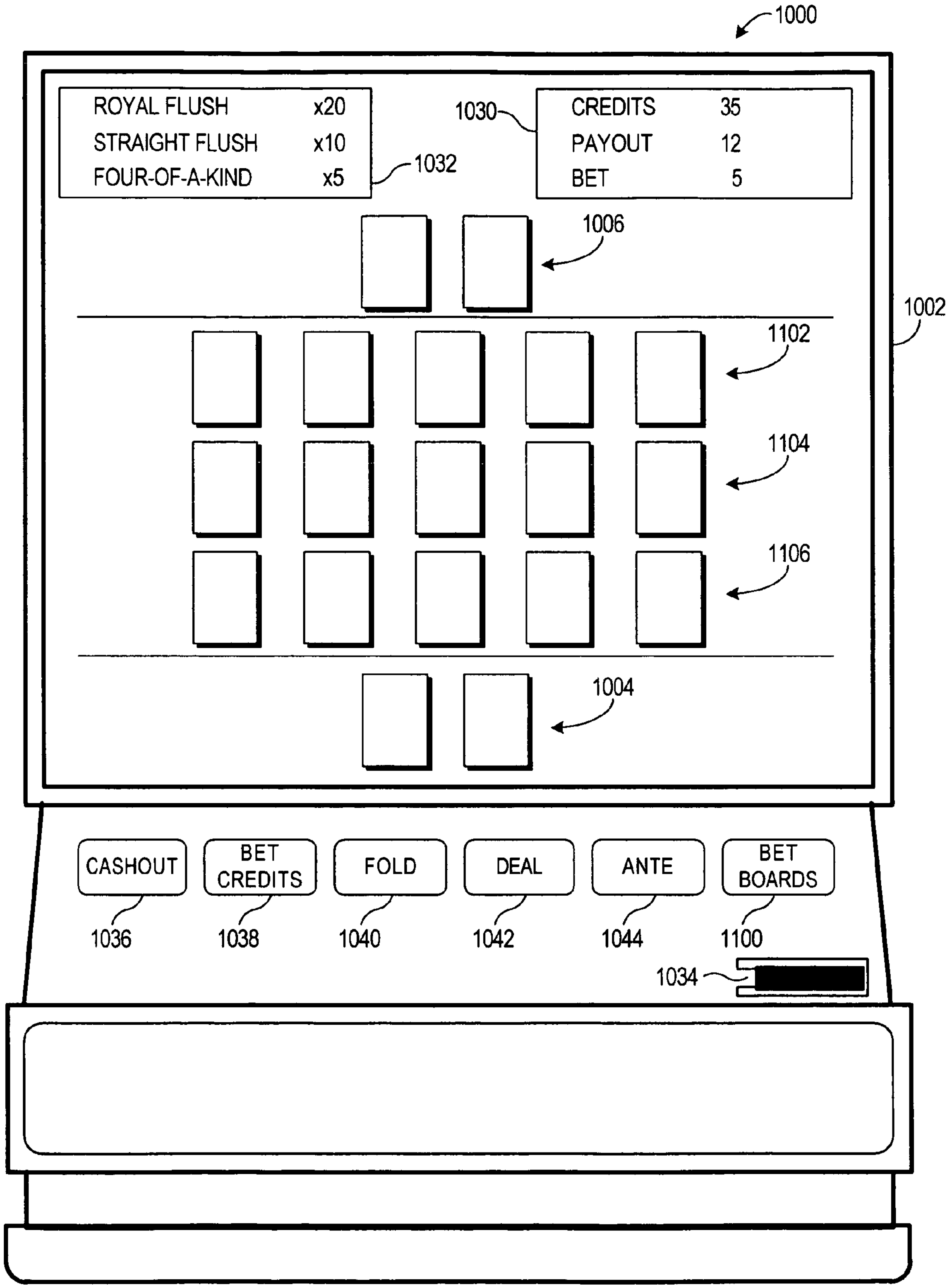
FIG. 11 illustrates a representative embodiment illustrating one manner for concurrently participating in multiple hands for the game according to the present invention.

The embodiment of FIG. 11 corresponds to the embodiment of FIG. 10, and the reference numbers of FIG. 10 are used in FIG. 11 where appropriate. The embodiment of FIG. 11 differs from the embodiment of FIG. 10 in that up to three boards may be concurrently played by the player. Any number of boards may be implemented, and three boards are used in the embodiment of FIG. 11 for purposes of illustration only. In this embodiment, the game is played as previously described, but the player may select one, two, or three boards to be concurrently played. If the player chooses to play three boards, the player may identify the number of boards to play by, for example, using the BET BOARDS button 1100. Alternative methods may also be used, such as by hitting the ANTE button 1044 for each number of community hands 1102, 1104, 1106 that are desired for play.

When the player has submitted the ante, and the number of community hands 1102, 1104, 1106 has been selected, the player can press the DEAL button 1042, and the player's and dealer's starting hands 1004, 1006 may be dealt. Alternatively, the starting hands 1004 and 1006 may automatically be dealt upon the player placing the ante bets.

The FOLD button 1040 allows the player to fold on any, all, or none of the concurrent hands that will be played. If the player folds for any hand, the corresponding ante amount is forfeited. If the player does not fold, the player may activate the BET CREDITS button 1038 one or more times to place a wager which is displayed by bet display 1030. In one embodiment, different bet amounts may be placed for each of the concurrent hands being played, or all hands may be subject to a common bet amount.

The DEAL button 1042 may be used to initiate the rest of the play. For example, pressing the DEAL button 1042 may cause the dealer's starting hand 1006 to be compared against the appropriate qualifying criteria and to pay out an amount for each of the concurrent hands played if the dealer does not qualify. If the dealer hand qualifies, the dealer will call the bets and deal the number of community hands 1102, 1104, 1106 selected by the player. Alternatively, such action may automatically occur in response to the player making a bet.

When (and if) the bets have been placed and the community hands 1102, 1104, 1106 identified by the player for play have been dealt, winning hands are determined for each of the concurrently-played hands. For example, a first resulting dealer hand will be determined using the dealer starting hand 1006 and community hand 1102, which will be compared against a first resulting player hand using the player starting hand 1104 and the community hand 1102. Bets for this hand will be settled. If the player selected to concurrently play another hand, a second resulting dealer hand will be determined using the dealer starting hand 1006 and community hand 1104, which will be compared against a second resulting player hand using the player starting hand 1104 and the community hand 1104, and bets for this hand will be settled. This continues for each of the number of concurrent boards selected by the player.

It should be noted that such a game may not allow for player selection of the number of concurrent games, but rather the game may be a fixed, concurrent-play game. For example, the game may require the player to participate in three hands concurrently. It should also be noted that such a concurrent-play game is equally applicable to a live table version of the game according to the present invention. The concurrent play in accordance with the present invention may be determined in a manner as set forth herein, and in connection with a system and method as described in U.S. patent application Ser. No. 10/351,983 filed on Jan. 27, 2003, and in U.S. Pat. No. 6,511,068 issued on Jan. 28, 2003, both of which are incorporated herein in their entirety.

In accordance with another embodiment of the invention, multiple dealers/multiple house hands may be implemented. For example, in a live table version, the dealer may deal multiple dealer starting hands (i.e., multiple starting hands to the dealer), or alternatively two or more dealers may each deal a starting hand to themselves. This allows the player to participate in multiple games or to allow the game to be played in a different manner. In an electronic version, multiple dealer starting hands would be presented.

More particularly, consider for purposes of illustration an embodiment involving a live table version of the game, where one dealer deals two starting hands to himself/herself as multiple dealer starting hands. For purposes of illustration, it will be assumed that the dealer will have two starting hands, although the number can be greater than two. The player may provide two ante bets, one for each of the dealer starting hands. In one embodiment, the player is dealt a single starting hand, although there are multiple dealer starting hands. In one embodiment, the player may fold on one or both bet opportunities, thereby forfeiting each respective ante, or may otherwise place a bet against the hands of either or both of the dealers. Where the player bets rather than folds, it is determined whether each dealer starting hand qualifies, and the dealer thereby calls the respective bet or loses due to failure to qualify on the multiple dealer starting hands. In one embodiment, the dealer then deals a single community hand to be used with the player's starting hand and each of the dealer's starting hands. The player's resulting hand is compared against each number of the dealer's resulting hands that are still active (i.e., qualified), and the bets are settled.

Such an embodiment may be particularly interesting in situations such as where the player is given the opportunity to make multiple bets when receiving a good starting hand. For example, the player may decide to play against two dealer hands, and thus provides two ante bets. If the player was to receive a good starting hand such as a pair, the player can bet on both hands, and in fact may opt to bet a higher bet amount where multiple bet amounts are allowed. The player would also have the opportunity to fold on one hand and bet on the other, which may occur if the player believes his/her hand will beat one dealer but not the other, or if the player's hand is not good enough to risk losing two bets, or the like.

In one embodiment, the player plays against each dealer/dealer hand independently, in that the player may lose the bets to both dealer hands, may win one bet and lose the other bet, or may win both bets. In another embodiment, the player may have to beat both (or all where more than two) dealer hands in order to win any amount. For example, if the player's resulting hand beats none or one of the dealer hands, the player would lose. However, in such an embodiment where the player needs to beat both dealer hands, the return may be greater. For example, if the player bet $5 for each of the two dealer hands and the player's resulting hands beats both dealer resulting hands, the player may net, for example, $10 for each of the dealer hands for a net win of $20 (rather than a net win of $10 total).

In one embodiment of the invention, the dealer may simply deal multiple dealer starting hands, and the player may, or may not, opt to ante up for both hands. If the player provides one ante, the player would play in the normal fashion against one of the dealer's starting hands, which may be designated in some manner as the dealer's primary starting hand. If the player provides a second ante, the player would play against both dealer hands. In such an embodiment, the dealer deals multiple dealer starting hands to afford each player the opportunity to play against multiple dealer hands, but the player is not required to. The dealer will know whether the player is playing against one or both (or more) dealer starting hands by the ante bet placed by the player. If the player chooses to play against multiple dealer hands, the player may be the same amount or a different amount for each of the dealer hands.

As previously indicated, the qualification criteria may be established in any desired manner. For example, it may be determined whether the dealer's starting hand has met some predetermined qualification criteria, such as the starting hand being at least some predetermined poker rank. In accordance with another embodiment, the predetermined qualification criteria may be a mathematical computation derived from the dealer's starting hand. For example, the sum, difference, product, quotient or other mathematical function, or any combination thereof, may be derived from the face value or other predetermined point value of the cards of the dealer's starting hand. It may be beneficial in some instances to derive such a point value for use as the qualifying criteria.

More particularly, it may be beneficial to use all cards of the dealer's starting hand as a basis for the qualifying criteria, rather than just one card such as a 10-high or Q-high. For example, a starting hand of (9,8) may be a better starting hand than a (10,2). In such cases, the qualifying criteria may be based on multiple (i.e. some or all) cards of the dealer's starting hand. It may be difficult, however, for a dealer at a live table game implementing the present invention to compare the cards of the starting hand with a table of qualifying poker ranks. Therefore, in accordance with one embodiment of the invention, the qualifying criteria is based on a mathematical function derived from the dealer's starting hand. This allows a dealer to quickly compute whether the starting hand is a qualifying hand, rather than having to refer to or memorize a correlation between poker rank and qualifying starting hands.

In one embodiment of the invention, each card is associated with a point value corresponding to the face value of the card, and face cards are provided a common point value. For example, the "2" of hearts, spades, clubs and diamonds may all be associated with a point value of "2," all cards having a face value of "5" would be associated with a point value of "5," and so forth. Face cards may be provided a common point value, such as "10." For example, the 10, J, Q, K of each suit may be provided a value of "10." The Ace may be provided a value of "10" as well, or alternatively may be given a different value such as "11," or "1." In another embodiment, face cards may be given different point values, such as:

Jack=11

Queen=12

King=13

Ace=14 (or alternatively, Ace=1)

While any numeric values may be associated with the cards to facilitate mathematical calculation of the dealer's qualifying criteria, preferred embodiments of the invention involve associating logical point values with respective cards. A first example is now described. Assume the following point value allocation as shown in Table 3 below:

TABLE 3

| CARD | POINT VALUE |
|---|---|
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| J | 10 |
| Q | 10 |
| K | 10 |
| A | 11 |

Figure 12A:
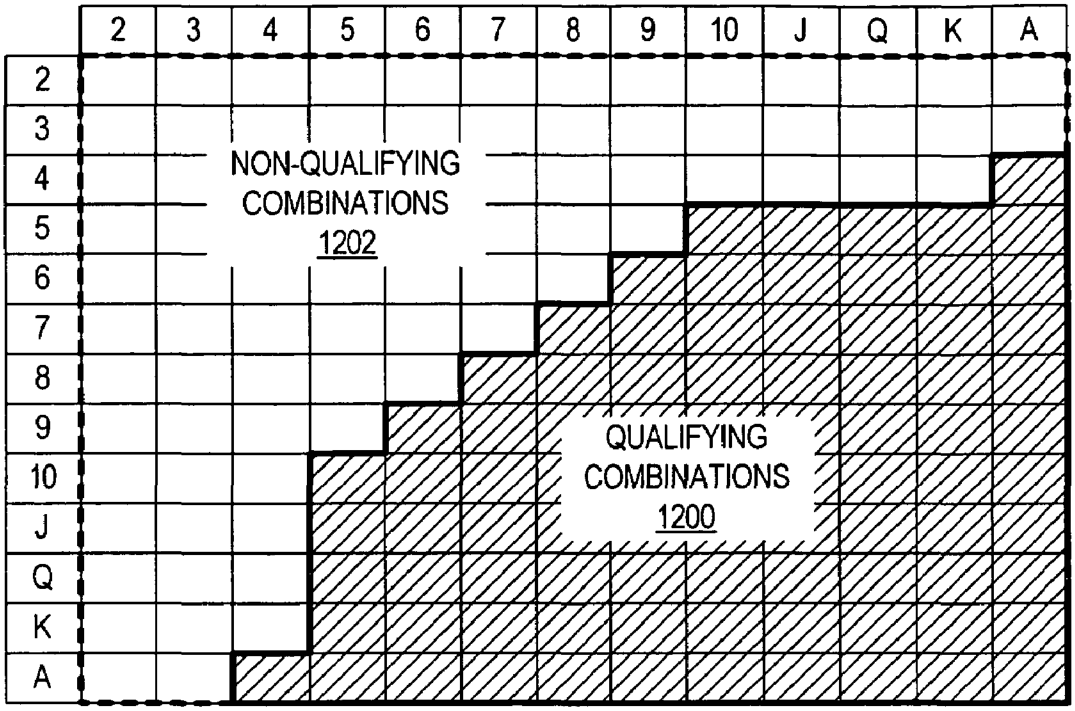
FIGS. 12A, 12B, 13A and 13B illustrate representative examples of dealer qualifying and non-qualifying card combinations in an embodiment of the invention where the qualifying criteria includes a mathematical qualifying criteria involving a mathematical function(s) of at least some of the cards in the dealer's starting hand.

It is further assumed for purposes of this example that the predetermined qualifying criteria, for a two-card starting hand, is set to a sum of the dealer's starting hand cards having a point value of fifteen (15), although any desired sum could be used. FIG. 12A illustrates the qualifying card combinations 1200 and the non-qualifying card combinations 1202 in such an example. For example, if the dealer's two-card starting hand includes a three and an eight (3,8) of any suit, the sum of the dealer's starting hand is eleven, which does not meet the established qualifying criteria of fifteen. The intersection of a three and an eight on the graph of FIG. 12A illustrates this, as each such intersection falls within the non-qualifying combinations 1202. On the other hand, receiving a king and a seven (K,7) produces a sum of seventeen (17) which is greater than the qualifying criteria of fifteen, and thus falls within the qualifying combinations 1200. Similarly, a dealer starting hand of (A,4) would also result in a qualifying hand for the dealer, as it produces a sum of fifteen and thus falls within the qualifying combinations 1200.

A second example is now described. Assume the following point value allocation as shown in Table 4 below:

TABLE 4

| CARD | POINT VALUE |
|---|---|
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| J | 11 |
| Q | 12 |
| K | 13 |
| A | 14 |

Figure 12B:
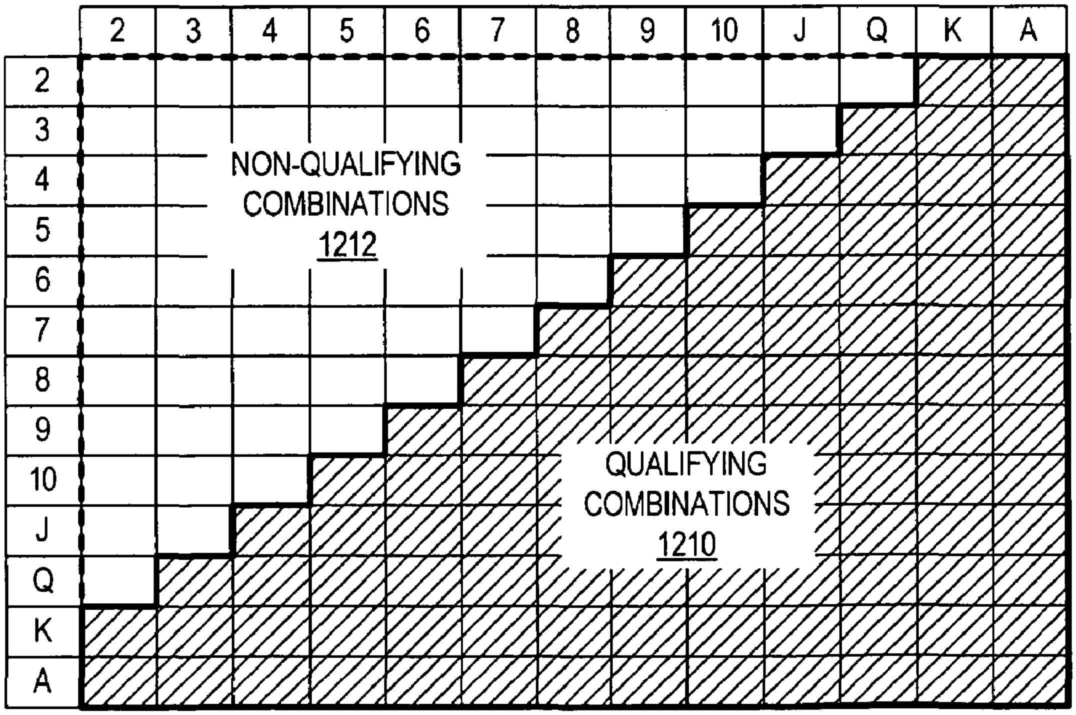

It is further assumed for purposes of this example that the predetermined qualifying criteria, for a two-card starting hand, is again set to a sum of the cards having a point value of fifteen (15), although it could be any desired sum. FIG. 12B illustrates the qualifying card combinations 1210 and the non-qualifying card combinations 1212 in such an example. For example, if the dealer's two-card starting hand includes a three and an eight (3,8) of any suit, the sum of the dealer's starting hand is eleven, which does not meet the established qualifying criteria of fifteen. The intersection of a three and an eight on the graph of FIG. 12B again illustrates this, as each such intersection falls within the non-qualifying combinations 1212. On the other hand, receiving a (K,2) produces a sum of fifteen, which is meets the qualifying criteria of fifteen, and thus falls within the qualifying combinations 1210.

Again, it should be noted that any point value may be assigned to the cards. However, in live table versions where a dealer is involved, it is easier for the dealer to determine whether a mathematical qualifying criteria is satisfied if the cards are assigned point values associated with their face values. For face cards, a common value such as ten points may be assigned to each of the face cards, again to assist the dealer in quickly determining whether the dealer's starting hand has qualified.

Other embodiments take into consideration other factors than the mathematical function (e.g., sum) when determining whether the dealer's starting hand has qualified. For example, factors such as a common suit for the dealer's starting hand cards, like cards (e.g., pairs), or other such factors may also be used in determining a qualifying dealer starting hand. Such factors may by themselves render a dealer qualifying hand as a qualifying hand, or may be used in connection with other factors and/or the mathematical functions described above.

For example, assuming a two-card dealer starting hand, the qualifying criteria may be established such that a like suit for both cards will cause the dealer's starting hand to qualify (e.g., two hearts, two clubs, etc.). In another embodiment, a mathematical sum or other mathematical function may be used in connection with suiting in this manner. For example, a starting hand of like suit may qualify if the mathematical sum is thirteen or greater (e.g., 9,5 of clubs).

Figure 13A:
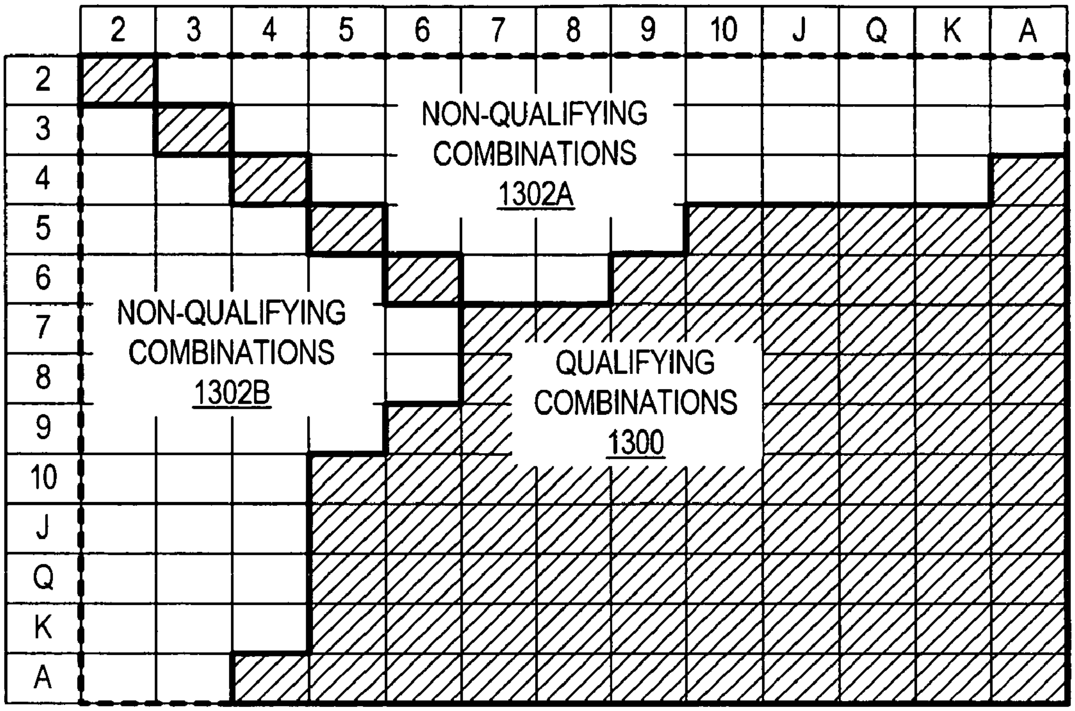

One such qualifying factor may be like cards rather than like suits. Assuming a two-card dealer starting hand, a "pair" is one such example. More particularly, combinations such as (2,2), (3,3), . . . (A,A) would render the dealer's starting hand as a qualifying hand. This qualifying factor, together with a predetermined mathematical function such as a sum, may collectively be used to establish the dealer qualifying criteria. FIG. 13A illustrates such an example, where the qualifying card combinations 1300 and the non-qualifying card combinations 1302A/1302B involve both a predetermined sum and the use of card pairs. In this example, any pair will result in a qualifying combination 1300, as indicated by the shaded intersections of each of the pairs (2,2), (3,3), through (A,A). In addition, a predetermined "sum" of the cards of the dealer's starting hand is also used in the illustrated embodiment to establish a qualifying hand. In the illustrated embodiment, the predetermined sum of the cards of the dealer's starting hand is assumed to be fifteen (15), as was described in connection with FIG. 12A. Thus, if the dealer's two-card starting hand includes a three and an eight (3,8) of any suit, the sum of the dealer's starting hand is eleven, which does not meet the established qualifying sum criteria of fifteen. The intersection of a three and an eight on the graph of FIG. 13A illustrates this, as each such intersection falls within the non-qualifying combinations 1302A and 1302B. On the other hand (and using the card values shown in Table 3), receiving a (Q,7) produces a sum of seventeen (17) which is greater than the qualifying criteria of fifteen, and thus falls within the qualifying combinations 1300. In this example, the qualifying criteria of a "pair," regardless of the sum of the cards comprising the pair, is used in addition to the mathematical sum function.

Figure 13B:
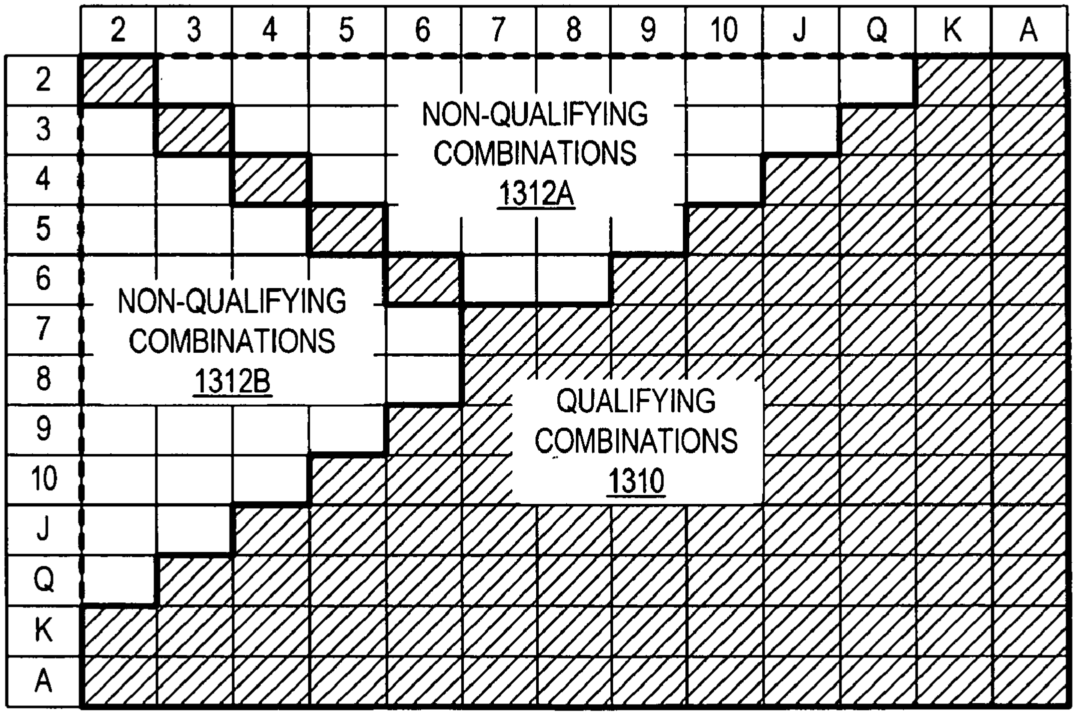

FIG. 13B illustrates another representative embodiment using both a mathematical sum and pairs to determine whether the dealer's starting hand has qualified. This embodiment uses the point value allocation as set forth in Table 4 and assumes a qualifying sum of fifteen (15), and thus corresponds to the example of FIG. 12B with the addition of pairs for qualifying criteria. Therefore, the qualifying combinations 1310 include all card pairs, and all sums of fifteen or greater according to Table 4. The non-qualifying combinations 1312A/1312B represent the remaining card combinations.

Figure 14:
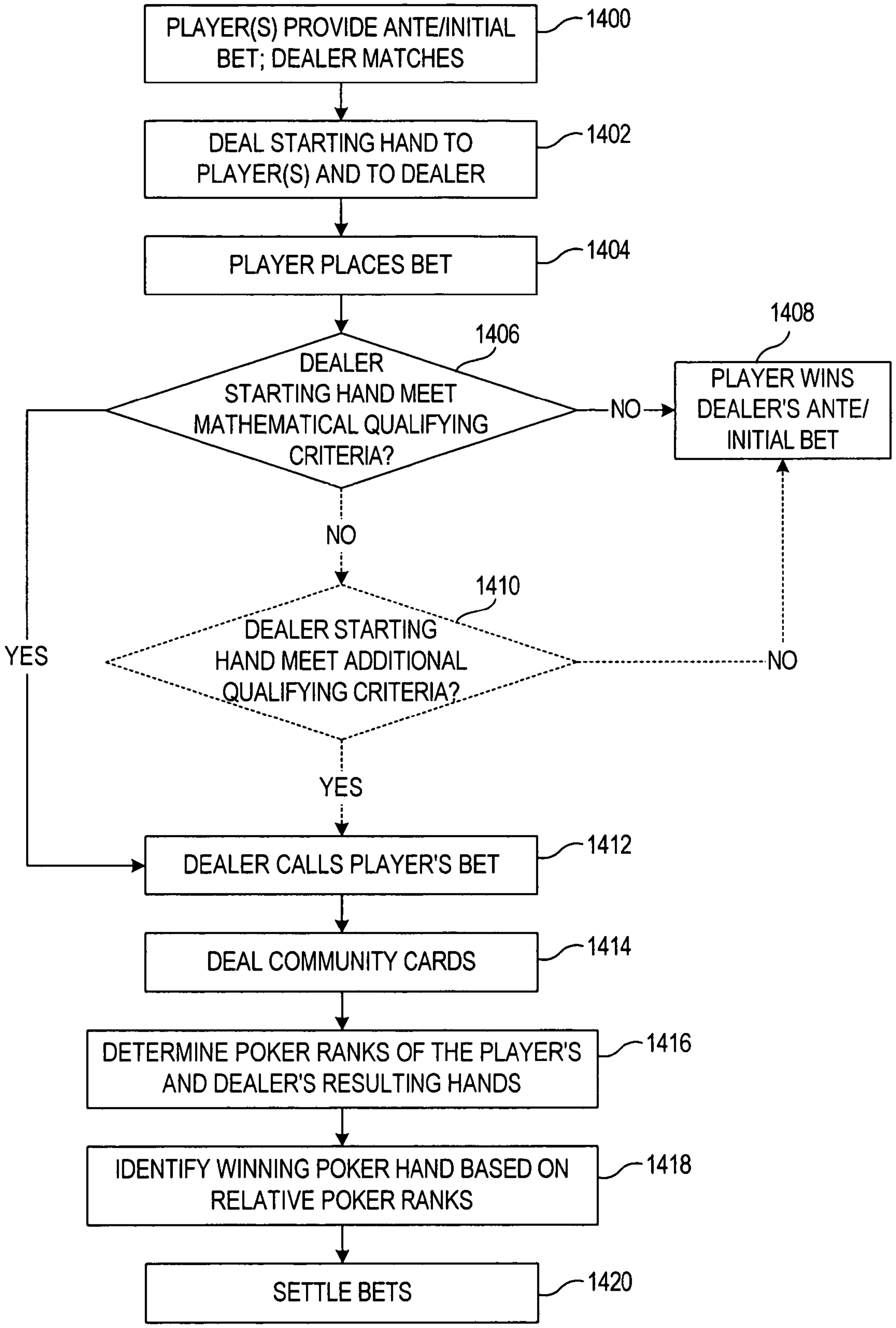
FIG. 14 is a flow diagram illustrating one embodiment of the present invention, where a mathematical function is used to determine whether the dealer's starting hand is a qualifying hand.

FIG. 14 is a flow diagram illustrating one embodiment of the present invention, where a mathematical function is used to determine whether the dealer's starting hand is a qualifying hand. In the illustrated embodiment, the player(s) provides an initial bet (e.g., ante) and the dealer calls or otherwise matches the ante as shown at block 1400. Starting hands are dealt 1402 to the player(s) and to the dealer, and the player places a bet as shown at block 1404. Assuming the player did not fold, it is determined 1406 whether the dealer's starting hand meets the mathematical qualifying criteria. In accordance with the invention, this mathematical qualifying criteria involves a mathematical function involving at least some, or all, of the cards in the dealer's starting hand. The mathematical function may be a sum of the all of the cards of the starting hand as previously described. In another embodiment, a sum of a subset of the cards may be used, such as a sum of the two highest cards in a three-card starting hand. Further, the qualifying criteria may be that the calculated sum be higher, lower, or equivalent to the predetermined threshold.

In other embodiments, the mathematical function is any one or more of a sum, difference, product, quotient, etc. For example, a small difference between the cards may be indicative of a higher probability of obtaining a straight, straight flush, or other hand associated with a game where a sequence of cards is relevant. As a more particular example, where the difference between two starting cards is "1," this would indicate that the cards are sequential, and thus a difference of "1" may be used as a mathematical qualifying criteria. Other situations may exist where a product of a number of cards more accurately determines the qualifying criteria. In any event, if the dealer's starting hand does not meet the mathematical qualifying criteria, the player wins the dealer's ante as shown at block 1408.

Other criteria may optionally be used in addition to the mathematical qualifying criteria. For example, poker rank may be used, such as a "pair." Like suits may also be used as previously described. These and other such factors may be used in addition to the mathematical criteria. In the illustrated embodiment, if the dealer's starting hand does not meet the mathematical qualifying criteria as determined at decision block 1406, it may optionally be determined 1410 whether such additional criteria is met. If not, the player wins 1408 the dealer's ante or other initial bet. In any case, if the qualifying criteria is met, the dealer calls 1412 the player's bet or otherwise places a bet in response to the player's bet. In one embodiment, the dealer calls each of the players' bets, such that the dealer bets against each of the players with the same wager amount as was made by that player. For example, if the bet amount for the game is fixed at $5 and each of the players bets $5, then the dealer will call the $5 bet or otherwise match the $5 bet against each of the participating players.

In accordance with the invention, the dealer will not call any post-ante bets, or deal 1414 the community cards, unless the dealer's starting hand met the qualifying criteria. Where such criteria is met, the dealer will call 1412 the bets and deal 1414 the community cards. Using their respective starting hand in connection with the board, each player as well as the dealer derives the best poker hand possible (i.e., having the highest poker rank), as shown at block 1416. The winning poker hand is identified 1418, based on the relative poker ranks of each of the players' resulting hands with respect to the dealer's resulting hand, and the bets are settled 1420. For example, if a first player has a resulting hand having a higher poker rank than the dealer's resulting hand, that first player is a winner, and will receive the bet amount called by the dealer (i.e., the ante amount plus the player's bet amount). If a second player has a resulting hand having a lower poker rank than the dealer's resulting hand, that second player does not win, and forfeits his/her wagered amount to the dealer/house.

In one embodiment of the invention, the dealer's mathematical qualifying criteria is dependent on the amount wagered by the particular player. FIGS. 15A, 15B, and 15C illustrate representative embodiments of dealer mathematical qualifying criteria that is based on the amount wagered by the player. In the illustrated embodiments of FIGS. 15A, 15B and 15C, it is assumed that the mathematical qualifying function is a sum of a two-card dealer starting hand. FIG. 15A illustrates a single bet/single qualifier embodiment. In this embodiment, only one bet amount is available to the player, which is, for example, $5. The qualifying sum for such a bet is fixed at fifteen. In other words, the dealer must have starting hand cards that add up to fifteen or more in order to qualify. In another embodiment, a pair or other qualifying function (not shown) may used in addition to the qualifying sum of fifteen. The particular qualifier sum may be set to any desired sum. Further, in one embodiment, the qualifier sum may change within a range, such as change between fourteen and sixteen. Such a qualifier change within a range may be made randomly, which may be particularly interesting and easy to implement in an electronic version of the game.

FIG. 15B illustrates a multiple bet/single qualifier sum embodiment. In this embodiment, the qualifier sum remains the same (i.e. sum of fifteen or greater) regardless of the bet placed by the player. FIG. 15C illustrates a multiple bet/multiple qualifier sum embodiment, where the qualifier sum changes depending on the bet (or range of bets) placed by the player. For example, a $5 bet placed by the player results in a qualifier sum of thirteen, and a $10 bet results in a qualifier sum of seventeen in the illustrated embodiment. In this embodiment, any bet amount ($N) results in a qualifier sum that is a function of the bet amount as depicted by QUALIFIER(N). It should be noted that the bet amounts of $5, $10, through $N may be fixed, such that only those particular bet amounts are available for the player to bet. In other words, the player may have the option of betting $5, $10, etc., but may not bet an amount between those fixed amounts, or above or below the highest or lowest allowable bet respectively. In another embodiment, the bet amounts may be ranges, such that bets can be placed anywhere between $5 and $N, and the qualifier will change when the player bet reaches the next level. For example, a bet of $5, $6, $7, $8, or $9 (assuming bets on a whole dollar levels only) will result in a qualifier sum of thirteen, and a bet of $10 through the next level will result in a qualifier sum of seventeen, and so forth. Again, these represent examples only, and the qualifying sum and correspondence with bet amounts may be selected in any desired manner.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather set forth by the claims appended hereto.

What is claimed is:

1. A method for playing a card game, comprising:

dealing a starting hand to at least one player and to the dealer, wherein each starting hand includes one or more cards representing a potential portion of a resulting poker hand;

placing a bet by the player;

determining whether the dealer's starting hand meets a mathematical qualifying criteria based on a plurality of the cards in the dealer's starting hand;

placing a bet by the dealer in response to the player's bet, and dealing a community hand, if the dealer's starting hand meets the mathematical qualifying criteria;

determining a player poker rank for the player's resulting poker hand derived from cards including the player's starting hand and the community hand;

determining a dealer poker rank for the dealer's resulting poker hand derived from cards including the dealer's starting hand and the community hand; and identifying a winning poker hand based on the player's resulting poker hand and the dealer's resulting poker hand.

2. The method of claim 1, wherein the plurality of the cards in the dealer's starting hand to which the mathematical qualifying criteria is based comprises all of the cards in the dealer's starting hand.

3. The method of claim 1, wherein the plurality of the cards in the dealer's starting hand to which the mathematical qualifying criteria is based comprises a subset of the cards in the dealer's starting hand.

4. The method of claim 1, wherein determining whether the dealer's starting hand meets a mathematical qualifying criteria comprises determining whether a sum of point values of the plurality of the cards in the dealer's starting hand is greater than or equal to a predetermined value.

5. The method of claim 4, wherein each card of a suit is associated with a different point value.

6. The method of claim 4, wherein at least some of the cards of a suit are associated with a common point value.

7. The method of claim 4, wherein the point values of the plurality of cards in the dealer's starting hand is established as:

| CARD | POINT VALUE |
|---|---|
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| J | 11 |
| Q | 12 |
| K | 13 |
| A | 14. |

8. The method of claim 4, wherein the point values of the plurality of cards in the dealer's starting hand is established as:

| CARD | POINT VALUE |
|---|---|
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| J | 10 |
| Q | 10 |
| K | 10 |
| A | 11. |

9. The method of claim 1, wherein determining whether the dealer's starting hand meets a mathematical qualifying criteria comprises determining whether a sum of point values of the plurality of the cards in the dealer's starting hand is less than or equal to a predetermined value.

10. The method of claim 1, wherein determining whether the dealer's starting hand meets a mathematical qualifying criteria comprises determining whether a product of point values of the plurality of the cards in the dealer's starting hand is greater than or equal to a predetermined value.

11. The method of claim 1, wherein determining whether the dealer's starting hand meets a mathematical qualifying criteria comprises determining whether a product of point values of the plurality of the cards in the dealer's starting hand is less than or equal to a predetermined value.

12. The method of claim 1, wherein determining whether the dealer's starting hand meets a mathematical qualifying criteria comprises determining whether a difference of point values of the plurality of the cards in the dealer's starting hand is greater than or equal to a predetermined value.

13. The method of claim 1, wherein determining whether the dealer's starting hand meets a mathematical qualifying criteria comprises determining whether a difference of point values of the plurality of the cards in the dealer's starting hand is less than or equal to a predetermined value.

14. The method of claim 1, wherein determining whether the dealer's starting hand meets a mathematical qualifying criteria comprises determining whether a quotient of point values of the plurality of the cards in the dealer's starting hand is greater than or equal to a predetermined value.

15. The method of claim 1, wherein determining whether the dealer's starting hand meets a mathematical qualifying criteria comprises determining whether a quotient of point values of the plurality of the cards in the dealer's starting hand is less than or equal to a predetermined value.

16. The method of claim 1, wherein determining whether the dealer's starting hand meets a mathematical qualifying criteria further comprises determining whether the dealer's starting hand meets secondary qualifying criteria.

17. The method of claim 16, wherein the secondary qualifying criteria comprises cards in the dealer's starting hand having equivalent card ranks.

18. The method of claim 16, wherein the dealer's starting hand comprises two cards, and wherein the secondary qualifying criteria comprises a pair.

19. The method of claim 16, wherein the secondary qualifying criteria comprises cards in the dealer's starting hand having equivalent card suits.

20. The method of claim 1, wherein placing a bet by the player comprises placing a fixed bet of a predetermined amount.

21. The method of claim 1, wherein placing a bet by the player comprises selecting, by the player, one of a plurality of fixed bets of corresponding predetermined amounts.

22. The method of claim 21, wherein determining whether the dealer's starting hand meets the mathematical qualifying criteria comprises determining whether the dealer's starting hand meets one of a plurality of predetermined mathematical qualifying criteria alternatives corresponding to the fixed bet selected by the player.

23. The method of claim 21, wherein determining whether the dealer's starting hand meets the mathematical qualifying criteria comprises identifying one of a plurality of predetermined mathematical qualifying criteria alternatives based on the fixed bet selected by the player.

24. The method of claim 23, further comprising associating at least some of the predetermined mathematical qualifying criteria alternatives with different predetermined amounts of the fixed bets.

25. The method of claim 21, wherein the mathematical qualifying criteria comprises a sum of the plurality of the cards in the dealer's starting hand, and further comprising establishing different qualifying sums based on the fixed bet selected by the player.

26. The method of claim 25, wherein establishing different qualifying sums comprises increasing the qualifying sum to correspond to an increase in the predetermined amounts of the fixed bets.

27. The method of claim 1, wherein placing a bet by the player comprises wagering, by the player, one of a plurality of wager amounts available to the player.

28. The method of claim 27, further comprising establishing different mathematical qualifying criteria based on the wager amount wagered by the player.

29. The method of claim 27, further comprising establishing a single predetermined mathematical qualifying criteria applicable to all of the wager amounts wagered by the player.

30. The method of claim 1, wherein dealing a starting hand comprises dealing a two-card starting hand to the player and to the dealer.

31. The method of claim 30, wherein dealing a community hand comprises dealing a five-card community hand.

32. The method of claim 31, wherein:

determining a player poker rank for the player's resulting poker hand comprises determining a player poker rank for a five-card player resulting poker hand derived from the player's two-card starting hand and the five-card community hand; and determining a dealer poker rank for the dealer's resulting poker hand comprises determining a dealer poker rank for a five-card dealer resulting poker hand derived from the dealer's two-card starting hand and the five-card community hand.

33. The method of claim 32, wherein identifying a winning poker hand comprises identifying a highest poker rank of the player poker rank and the dealer poker rank.

34. The method of claim 1, further comprising placing initial bets by the at least one player and by the dealer prior to dealing the starting hands.

35. The method of claim 34, wherein placing initial bets by the dealer comprises calling the at least one player's initial bet.

36. The method of claim 34, further comprising foregoing placing the bet by the player and consequently the opportunity to obtain a player's resulting poker hand, and forfeiting the player's initial bet, at the player's election after receiving the player's starting hand.

37. The method of claim 34, further comprising foregoing placing the bet by the dealer and consequently the opportunity to obtain a dealer's resulting poker hand, and forfeiting the dealer's initial bet, if the dealer's starting hand does not meet the mathematical qualifying criteria.

38. The method of claim 1, further comprising awarding the player with a bonus if the player poker rank for the player's resulting poker hand is greater than or equal to a predetermined poker rank.

39. The method of claim 1, further comprising:

establishing one or more predetermined poker ranks and corresponding bonus payout amounts; and awarding the player with the bonus payout amount corresponding to the predetermined poker rank achieved by the player poker rank.

40. The method of claim 1, further comprising awarding the player with a bonus if a poker rank for a subset of an aggregate of the player's starting hand and the community hand is greater than or equal to a predetermined poker rank.

41. The method of claim 1, further comprising awarding the player with a bonus if a poker rank for the player's starting hand is greater than or equal to a predetermined poker rank.

42. The method of claim 1, further comprising:

establishing one or more predetermined poker ranks and corresponding bonus payout amounts; and awarding the player with the bonus payout amount corresponding to the predetermined poker rank achieved by a poker rank of the player's starting hand.

43. The method of claim 1, wherein dealing a community hand comprises dealing one or more partial community hands having fewer cards than a total community hand, and further comprising:

placing subsequent bets by the player in response to one or more of the partial community hands and the total community hand;

calling the subsequent bets by the dealer; and collecting the bets, subsequent bets, and the initial bets by the dealer or the player identified as having the winning poker hand.

44. A method for electronically providing a card game, comprising:

displaying a player starting hand and a dealer starting hand to the player, wherein each starting hand includes one or more cards representing a potential portion of a resulting poker hand;

placing a bet by the player;

determining whether the dealer starting hand meets a mathematical qualifying criteria based on a plurality of the cards in the dealer's starting hand;

placing a bet by a virtual dealer in response to the player's bet, and displaying a multi-card community hand, if the dealer starting hand meets the mathematical qualifying criteria;

determining a player poker rank for the player's resulting poker hand derived from cards including the player's starting hand and the multi-card community hand;

determining a dealer poker rank for the virtual dealer's resulting poker hand derived from cards including the dealer starting hand and the multi-card community hand; and identifying a winning poker hand based on the player's resulting poker hand and the virtual dealer's resulting poker hand.

45. The method of claim 44, wherein the plurality of the cards in the dealer's starting hand to which the mathematical qualifying criteria is based comprises all of the cards in the dealer starting hand.

46. The method of claim 45, wherein the mathematical qualifying criteria comprises any one or more of a sum, difference, product or quotient of all of the cards in the dealer starting hand.

47. The method of claim 44, wherein the plurality of the cards in the dealer's starting hand to which the mathematical qualifying criteria is based comprises a subset of the cards in the dealer starting hand.

48. The method of claim 47, wherein the mathematical qualifying criteria comprises any one or more of a sum, difference, product or quotient of the subset of the cards in the dealer starting hand.

49. The method of claim 44, further comprising placing an ante bet by both the player and the virtual dealer.

50. The method of claim 49, further comprising determining an aggregate total of the bets and ante bets of the player and the virtual dealer, and awarding the aggregate total to the player or the virtual dealer identified as having the winning poker hand.

51. The method of claim 50, wherein awarding the aggregate total to the dealer comprises forfeiting the bet and the ante bet placed by the player.

52. The method of claim 44, further comprising providing the player with a selectable choice for an amount of the bet placed by the player.

53. The method of claim 52, further comprising establishing different mathematical qualifying criteria based on the amount of the bet placed by the player.

54. The method of claim 52, wherein providing the player with a selectable choice for an amount of the bet placed by the player comprises providing a user interface by which the player selects the amount of the bet placed.

55. A method for playing a card game, comprising:

placing first bets by a plurality of players;

dealing a starting hand to each of the plurality of players and to a dealer, wherein each starting hand includes one or more cards representing a potential portion of a resulting poker hand;

placing second bets by one or more of the players who choose to continue participating in the card game;

determining whether a mathematical sum of values associated with the cards in the dealer's starting hand is greater than or equal to a predetermined sum;

calling the players' bets by the dealer, and dealing a community hand, if the mathematical sum of values associated with the cards in the dealer's starting hand is greater than or equal to a predetermined sum;

for each player who placed the second bets, determining player poker ranks for each player's resulting poker hand derived from cards including the community hand and each respective player's starting hand;

determining a dealer poker rank for the dealer's resulting poker hand derived from cards including the dealer's starting hand and the community hand; and identifying a winning poker hand based on the players' resulting poker hands and the dealer's resulting poker hand.

56. A method for playing a card game, comprising:

dealing a starting hand to at least one player and to the dealer, wherein each starting hand includes one or more cards representing a potential portion of a resulting poker hand;

placing a bet by the player for each concurrent hand desired for participation;

determining whether the dealer's starting hand meets mathematical qualifying criteria based on at least some of the cards in the dealer's starting hand;

if the dealer's starting hand meets the mathematical qualifying criteria, placing a bet by the dealer in response to each of the player's bets, and dealing a separate community hand for each of the concurrent hands in which the player is participating;

determining player poker ranks for each player resulting poker hand derived from cards including the player's starting hand and each of the community hands;

determining dealer poker ranks for the dealer resulting poker hand derived from cards including the dealer's starting hand and each of the community hands; and identifying a plurality of winning poker hands based on the player resulting poker hands and corresponding dealer resulting poker hands.

* * * * *